US009128192B2

(12) United States Patent
Christophersen et al.

(10) Patent No.: US 9,128,192 B2
(45) Date of Patent: Sep. 8, 2015

(54) APPARATUS SYSTEMS AND METHODS OF SENSING CHEMICAL BIO-CHEMICAL AND RADIOLOGICAL AGENTS USING ELECTROPHORETIC DISPLAYS

(75) Inventors: Marc Christophersen, Berwyn Heights, MD (US); Bernard F. Phlips, Great Falls, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 783 days.

(21) Appl. No.: 13/019,675

(22) Filed: Feb. 2, 2011

(65) Prior Publication Data

US 2012/0193551 A1    Aug. 2, 2012

(51) Int. Cl.
*G01T 1/02* (2006.01)
*H01J 3/14* (2006.01)
*G02F 1/167* (2006.01)

(52) U.S. Cl.
CPC . *G01T 1/02* (2013.01); *G02F 1/167* (2013.01); *H01J 3/14* (2013.01)

(58) Field of Classification Search
CPC ........... G01T 1/00–1/152; G02F 1/167; G02F 2001/1672
USPC ........ 204/606, 450; 359/290, 296; 250/472.1, 250/473.1, 474.1, 475.2, 482.1, 484.5
See application file for complete search history.

(56) References Cited

U.S. PATENT DOCUMENTS

| | | | | |
|---|---|---|---|---|
| 2,593,540 | A | * | 4/1952 | Zender et al. .................. 210/641 |
| 4,686,524 | A | * | 8/1987 | White ............................ 345/107 |
| 5,961,804 | A | | 10/1999 | Jacobson et al. |
| 6,067,185 | A | | 5/2000 | Albert et al. |
| 6,512,354 | B2 | | 1/2003 | Jacobson et al. |
| 6,721,083 | B2 | * | 4/2004 | Jacobson et al. .............. 359/296 |
| 7,312,916 | B2 | * | 12/2007 | Pullen et al. .................. 359/296 |

(Continued)

FOREIGN PATENT DOCUMENTS

WO    WO 9910769 A1 *  3/1999

OTHER PUBLICATIONS

The SiPix Microcup, [Accessed via the Internet], Feb. 4, 2011, pp. 1-2.

(Continued)

*Primary Examiner* — J. Christopher Ball
*Assistant Examiner* — Maris R Kessel
(74) *Attorney, Agent, or Firm* — US Naval Research Laboratory; Joseph T. Grunkemeyer

(57) ABSTRACT

Caesium-137 irradiates electronic paper. An incoming gamma-ray from the Cs-137 interacts with a particle inside a micro-container by generating a recoil electron and/or a hole. Because the recoil electron physically leaves the particle, the particle is charged depending on the dose from the radiation source. And, the charge of the particles change, which results in a movement of the particles within the micro-container. After refreshing the electronic paper, a visible difference in the gray-scale can be seen. Thus, the visible difference in the gray-scale is an effect caused by the irradiation of the electronic paper, showing sensitivity to high energy radiation—thus, non-optimized electronic paper is sensitive to high energy radiation and can be used as a radiation dosimeter. In addition, electronic paper can be used for sensing chemical and bio-chemical agents, as well as detecting high energy radiation.

6 Claims, 15 Drawing Sheets

(56) References Cited

U.S. PATENT DOCUMENTS

| | | | |
|---|---|---|---|
| 8,115,182 B1* | 2/2012 | Patel | 250/482.1 |
| 2006/0145091 A1* | 7/2006 | Patel | 250/474.1 |

OTHER PUBLICATIONS

Bang et al., Quantum Dot Sensitized Solar Cells. A Tale of Two Semiconductor Nanocrystals: CdSe and CdTe, American Chemical Society, 2009, pp. 1467-1476, vol. 3, No. 6, USA.

Bert et al., Complete electrical and optical simulation of electronic paper, Displays, Nov. 8, 2005, pp. 50-55, USA.

Liu and Lin, Electrochemical stripping analysis of orgonophosphate pesticides and nerve agents, Electrochemistry Communications, Feb. 19, 2005, pp. 339-343.

Guo and Zhao, Preparation of a kind of red encapsulated electrophoretic ink, Optical Materials, Mar. 5, 2004, pp. 297-300, USA.

Comisky et al., An electrophoretic ink for all-printed reflective electronic displays, Nature Jul. 16, 1998, vol. 394, pp. 253-255, Cambridge, USA.

Chen, Particle Charges in Nanaqueous Colloidal Dispersions, American Chemical Society, 1996, vol. 12, pp. 3437-3441, USA.

Lessner et al., The Dependence of Aqueous Sulfur-Polysulfide Redox Potential on Electrolyte Composition and Temperature, Journal of the Electrochemical Society, Jul. 1993, vol. 140, No. 7, pp. 1847-1849. The Electrochemical Society.

Shin et al., Minority carrier lifetime and diffusion length in HgTe/CdTe superlattices by molecular beam epitaxy, Applied Physics Letters, Sep. 7, 1992, vol. 61, No. 10, pp. 1196-1198, The American Institute of Physics, USA.

Hodes and Miller, Thermodynamic Stability of II-VI Semiconductor-Polysulfide Photoelectrochemical Systems, Journal of the Electrochemical Society: Solid-State Science and Technology, Oct. 1986, pp. 2177-2180, vol. 133, No. 10, USA.

Ellis et al., Visible Light to Electrical Energy Conversion. Stable Cadmium Sulfide and Cadmium Selenide Photoelectrodes in Aqueous Electrolytes, Journal of the American chemical Society, Mar. 17, 1976, pp. 1635-1637, vol. 98, No. 6, USA.

Ellis et al., Optical to Electrical Energy Conversion. Characterization of Cadmium Sulfide and Cadmium Selenide Based Photoelectrochemical Cells, Journal of the American chemical Society, Oct. 27, 1976, pp. 6855-6866, vol. 98, No. 22, pp. 1635-1637, USA.

E Ink Segmented Displays: Technical Spec sheet; Internet; [http://www.eink.com/sell_sheets?segmented_spec_sheet_sept2013.pdf]; (accessed Jan. 23, 2014); pp. 1-2; E-Ink; USA.

* cited by examiner

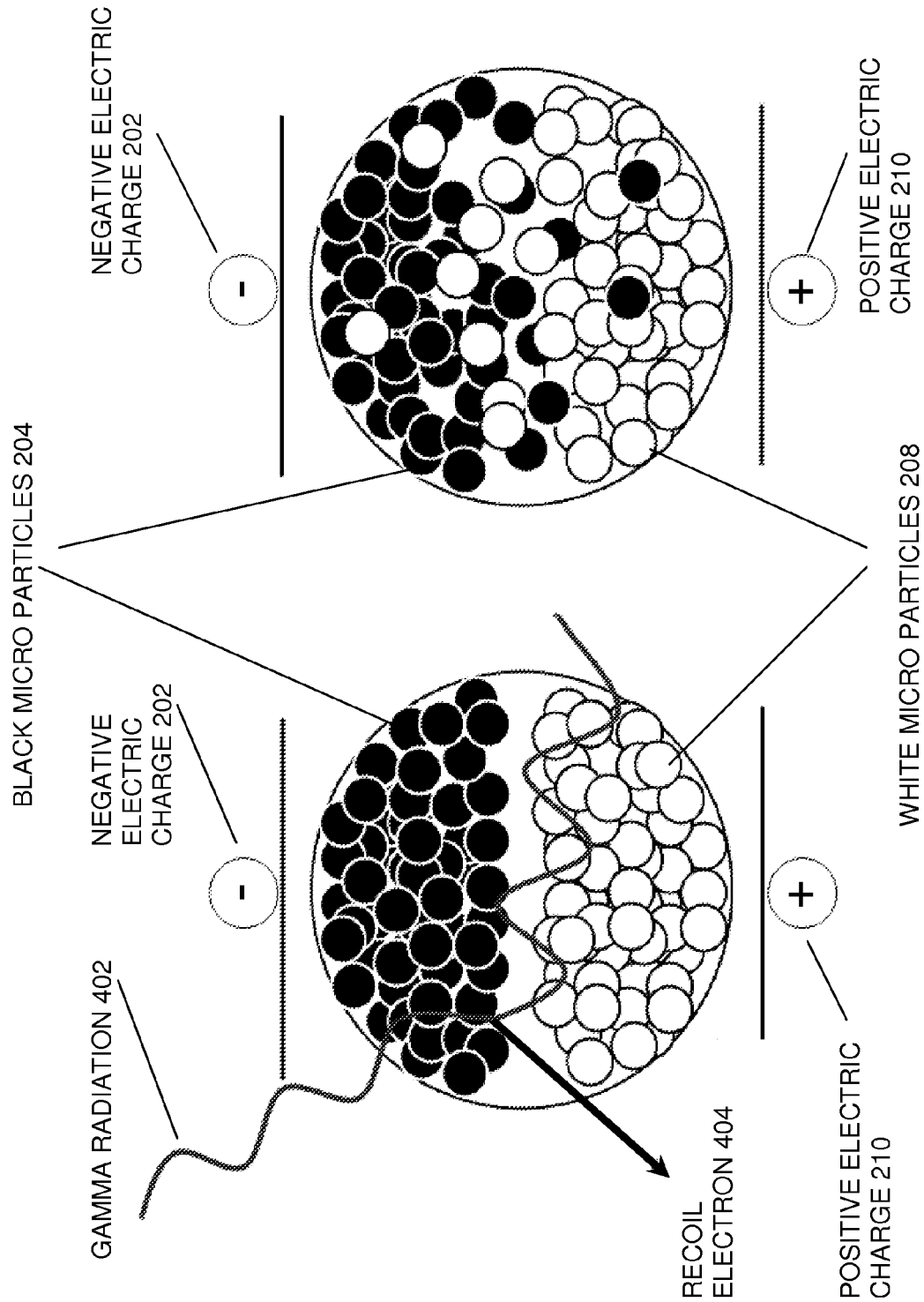

APPARATUS SYSTEMS AND METHODS OF SENSING CHEMICAL BIO-CHEMICAL AND RADIOLOGICAL AGENTS USING ELECTROPHORETIC DISPLAYS

FIELD OF THE INVENTION

The present invention relates to applications involving public, civilian and/or military first responders to high energy radiation, chemical or bio-chemical agents. In particular, the present invention presents a method, apparatus and system using a display device for reliable, combined detecting/sensing and displaying and/or indicating exposure to high energy radiation chemical and/or bio-chemical agents.

BACKGROUND OF THE INVENTION

Electronic paper was developed in 1992 at Xerox Palo Alto Research Center (PARC) by N. Sheridan as a new type of display technology. According to M. E. Howard, E. A. Richley, R. Sprague, and N. K. Sheridon, "GYRICON electronic paper", J. Soc. for Information Display, Vol. 4, pp. 215, 1998, this news type of display technology was called "GYRICON" and combined advantages of regular paper and electronic displays. Sheridan fabricated a rubber like sheet containing thousands of tiny balls. Half of the balls where white colored and were positively charged; the other half were black and had no charge. When a bias was applied, the balls were able to rotate and generate a black-and-white pattern. The most important difference to conventional electronic displays was that power was only consumed when the balls rotated; in other words, power was only consumed when the displayed pattern changed. The "GYRICON" technology was not pursued by Xerox and remained dormant until the mid-1990's. In 1999, Xerox teamed with 3M Corporation to mass-produce GYRICON e-paper but this effort is now discontinued.

In 1998, J. Jacobson of MIT published a Nature article with a slightly different approach to electronic paper (see B. Comiskey, J. D. Albert, H. Yoshizawa, J. Jacobson, "An electrophoretic ink for all-printed reflective electronic displays", Nature, vol. 394, pp. 253, 1998). Jacobson's approach comprised transparent micro-capsules filled with blue dye and white titanium oxide ($TiO_2$) particles. The diameters of the micro-capsules were approximately one hundred micrometers (100 μm) and made of low-molecular-weight polyethylene (see FIG. 1). The $TiO_2$ particles were negatively charged and could be moved within the microsphere by applying an external bias. In response to an electrical charge, the $TiO_2$ particles moved to the top or bottom of the capsule, thereby creating light or dark colored spots (see FIG. 2). Gray-tones were created by moving particles within the micro-sphere. The charge needed to "flip" one $TiO_2$ particle can be as low as $q=2.6\times10^{-18}$, $C=16$ $e^-$ for a; given solution. As in the GYRICON technology, power is only consumed when the particles are moved within the sphere. MIT commercialized this technology and founded E-INK, Inc. (hereafter "E-INK"). E-INK electronic paper is inexpensive and has been integrated into consumer products. FIG. 3 shows a LEXAR USB drive with electronic paper from E-INK includes an indicator of how much data is stored on the device. The work of J. Jacobson sparked wide interest in electrophoretic ink (i.e., electronic paper).

Electronic paper is comprised of micro-containers filled with charged particles (with diameters ranging from approximately 100 nanometers (nm) to a few micrometers (μm)), preferably between from about 200 nm to about 5 micrometers. These particles are charged and form a stable colloidal solution (i.e., no sedimentation of particles over time). An external electric field can move the particles within the micro-container and change the overall color of the device. Power is only consumed when the display appearance changes. Several research groups and companies modified Jacobson's approach; one example is "SiPix, Inc." (hereafter "SIPIX") (see http://www.sipix.com/technology/microcup.html). SIPIX uses microscale containers made from a flexible polymer. These containers act as hosts for the particles (see FIG. 4). The production is scaled up to large area flexible displays.

The mechanism of particle movement due to an external voltage within the electronic paper is still under investigation. Early investigations of electronic paper revealed that electrophoretic forces alone could explain the particle movement. Today, most researchers believe that the particle movement in electronic paper can be described and/or explained by electrophoretic and dielectrophoretic forces, where the influence of the electrophoretic forces dominate.

The property of the stable colloidal solution formed in the micro-container, containing particles is directly correlated to the operation and sensitivity of the device. The liquid layer surrounding the particle exists as two parts; an inner region (Stern layer) where the ions are strongly bound and an outer (diffuse) region where the ions are less firmly associated. Within the diffuse layer, there is a notional boundary inside which the ions and particles form a stable entity. When a particle moves (such as due to gravity or an external electric field), ions within the boundary move the particle. Those ions beyond the boundary stay with the bulk dispersant. The potential at this boundary (surface of hydrodynamic shear) is the zeta potential. The magnitude of the zeta potential gives an indication of the potential stability of the colloidal system and their mobility The general dividing line between stable and unstable suspensions is generally taken at either +30 or −30 millivolts (mV). Particles with zeta potentials more positive than +30 mV or more negative than −30 mV are normally considered stable. The zeta potential can be adjusted by the colloidal solution parameters, for example the pH value of the overall electrolyte conductivity modifies the zeta-potential. An important consequence of the existence of electrical charges of particles is that they interact with an applied electric field. These effects are collectively defined as electrokinetic effects. There are two effects which affect the particle's motion in the micro-container: The dominating force is electrophoreses: the movement of a charged particle relative to the liquid it is suspended in under the influence of an applied electric field. Furthermore, to a much less extent, dielectrophoresic force plays a role: Dielectrophoresis describes the movement of polarizable particles in a non-uniform electric field. Some non-uniform electric fields can fore due to shape of the micro-container.

Common electronic displays like LCDs (liquid crystal displays) require constant power. Electrophoretic displays are now commonly used in consumer electronics, like Amazon's Kindle. When the Electronic paper is irradiated, the incoming gamma-rays interact with the embedded particles and generate a recoil electron. This recoil electron physically leaves the particle and thereby changing particle's charge. Particles inside the micro-container form a stable colloidal solution. The particles' position and mobility within the micro-container is a direct function of their charge. Since the basic sensing principle of the electronic paper is based on charging particles within a transparent micro-container, then the electronic paper can also be used to detect chemical or biological agents with a sensing reaction that involves charge transfer.

Currently, members of the military, police, fire, and medical first responders require reliable indicators of their exposure to doses of dangerous radiological, chemical and/or biological agents, if they are operating in environments that might contain high energy radiation, chemical or bio-chemical agents, as might be present in conjunction with terrorist attacks and/or industrial attacks, where bad actors use dirty bombs containing radioactive materials or target nuclear power plants for sabotage and/or destruction or use contraband nuclear weapons, or environments where industrial accidents have occurred. This invention materially contributes to countering such terrorism, by providing immediate real time indications of CBR agents. Thus, minimizing the ability of terrorists to influence the policy of the government of the United States with tactics directed at intimidation and coercion by inflicting pain, suffering and death on US citizens and first responders through the use of undetected CBR weapons of mass destruction.

Radiation detection can be broadly grouped into two types of instruments: (i) radiation detectors and (ii) dosimeters. On the one hand, radiation detectors like the traditional Geiger Counter tend to be big and bulky. These devices cannot be worn on regular clothing. On the other hand, wearable dosimeters, such as a film badge dosimeter, do not give instant warning and can only be used once. Pen dosimeters have been in use for approximately 50 years but are bulky and require constant re-calibration.

Semiconductor based dosimeters require constant battery power. Constant power consumption is problematic due to limited battery lifetime and weight.

None of the current devices meet the following requirements: re-usable, provides instant indication of dosage, exhibits ultra-low power and weight, and is capable of being integrated into a regular uniform.

Currently, there are no known radiation dosimeters based on electrophoretic displays (i.e., based on electronic paper).

Currently, there are no known chemical and/or bio-chemical sensors based on electrophoretic displays.

Therefore, the need exists for a radiation dosimeter based on electrophoretic displays.

Furthermore, the need exists for a radiation sensor and/or bio-chemical sensor, based on electrophoretic displays, which are re-usable, provide instant indications of dosage, exhibit ultra-low power and weight, and are capable of being integrated into a regular uniform.

SUMMARY OF THE INVENTION

Apparatus, systems and methods of sensing chemical, bio-chemical and/or radiological agents using electrophoretic displays are implemented using a radioactive isotope Caesium-137 (Cs-137). Electronic paper from E-INK is irradiated using the Cs-137 source. An incoming gamma-ray interacts with a particle inside a micro-container by generating a recoil electron and/or a hole. Because the recoil electron physically leaves the particle, the particle is charged depending on the dose from the radiation source, and the charge of the particles change, which results in a movement of the particles within the micro-sphere (i.e., micro-container). After refreshing the electronic paper, a visible difference in the gray-scale was seen. It is noted that a temporary burn-in of an image (i.e., ghosting of an image) does not appear on electronic paper. Thus, any visible difference in the gray-scale is an effect caused by the irradiation of the electronic paper. Thus, non-optimized electronic paper is sensitive to high energy radiation.

Assuming a high ionization radiation with an energy of 222 keV (that is, the mean photon energy of typical gamma-ray background) and a dose of 100 milli Rontgen equivalent to mammal (mRem) and a layer of particles, within the electronic paper, with a thickness of 1 mm and a 10 percent fill factor (such as, the ratio of particle and solution volume), a calculated response to two different types of particles W (Tungsten, density 19.35 $g/cm^3$) and CdTe (Cadmium Telluride, density 5.86 $g/cm^3$). Also, assuming that only the kick-out of the recoil electron charged the particle. Based on the estimated dose and radiation energy, roughly 5,400 particles for W and 1,600 particles for CdTe, will move within the micro-container. This number of particles that moves also depends on the zeta potential, solution viscosity, and particle weight. According to B. Comiskey et al., it is estimated that approximately 16 electrons per particle are needed. For both the CdTe and the W, this change is detectable by the naked eye.

BRIEF DESCRIPTION OF THE DRAWINGS

FIG. 4A illustrates a Schematic of the detection principle of detection within the micro-sphere, where the charge of the particles are constant, which results in no movement of the particles within the micro-sphere.

FIG. 4B illustrates a Schematic of the detection principle of detection within the micro-sphere, where the charge of the particles change, which results in a movement of the particles within the micro-sphere.

DETAILED DESCRIPTION OF THE INVENTION

Figure 1:
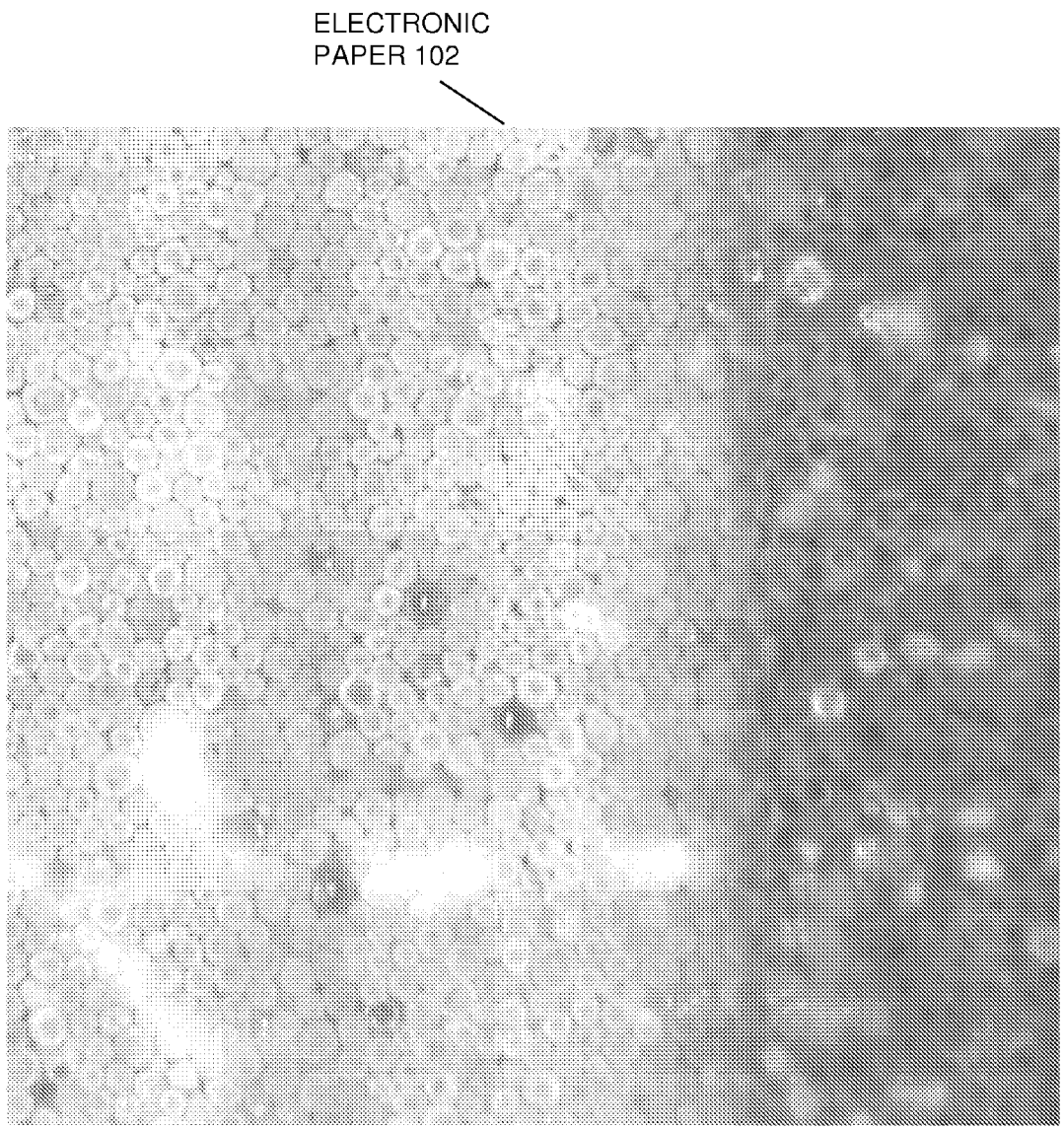
FIG. 1 is an optical micrograph illustrating the top-view of electronic paper with micro-spheres, 300 μm wide, where white, gray and black areas are visible.

Preferred exemplary embodiments of the present invention are now described with reference to the figures, in which like reference numerals are generally used to indicate identical or functionally similar elements. While specific details of the preferred exemplary embodiments are discussed, it should be understood that this is done for illustrative purposes only. A person skilled in the relevant art will recognize that other configurations and arrangements can be used without departing from the spirit and scope of the preferred exemplary embodiments. It will also be apparent to a person skilled in the relevant art that this invention can also be employed in other applications. Further, the terms "a", "an", "first", "second" and "third" etc. used herein do not denote limitations of quantity, but rather denote the presence of one or more of the referenced items(s).

Light weight and reliable dosimeters are central to several programs related to homeland security and emergency response. Most of the time, sensor material and displays are two independent components; each having its own specific weight and power limitation.

Electronic paper (or sometimes called electrophoretic displays) works by trapping microcapsules of white and black pigment, "electronic ink", inside a thin film, where they float in a transparent colloidal liquid, where Electrophoresis is the migration of charged particles in a liquid under the influence of an electric field. The micro-capsules are filled with negatively charged and positively charged particles with different colors (black and white). By laminating the film onto a substrate that can apply an electrical charge (such as a negative electric charge 202 or a positive electric charge 210), either the black or the white micro-spheres of electronic ink can be forced to the surface at specific pixel locations. Both rigid and flexible substrates, ranging in pixel density from 100 to 400 dpi (dots per inch), have been demonstrated with electrophoretic displays.

Figure 3:
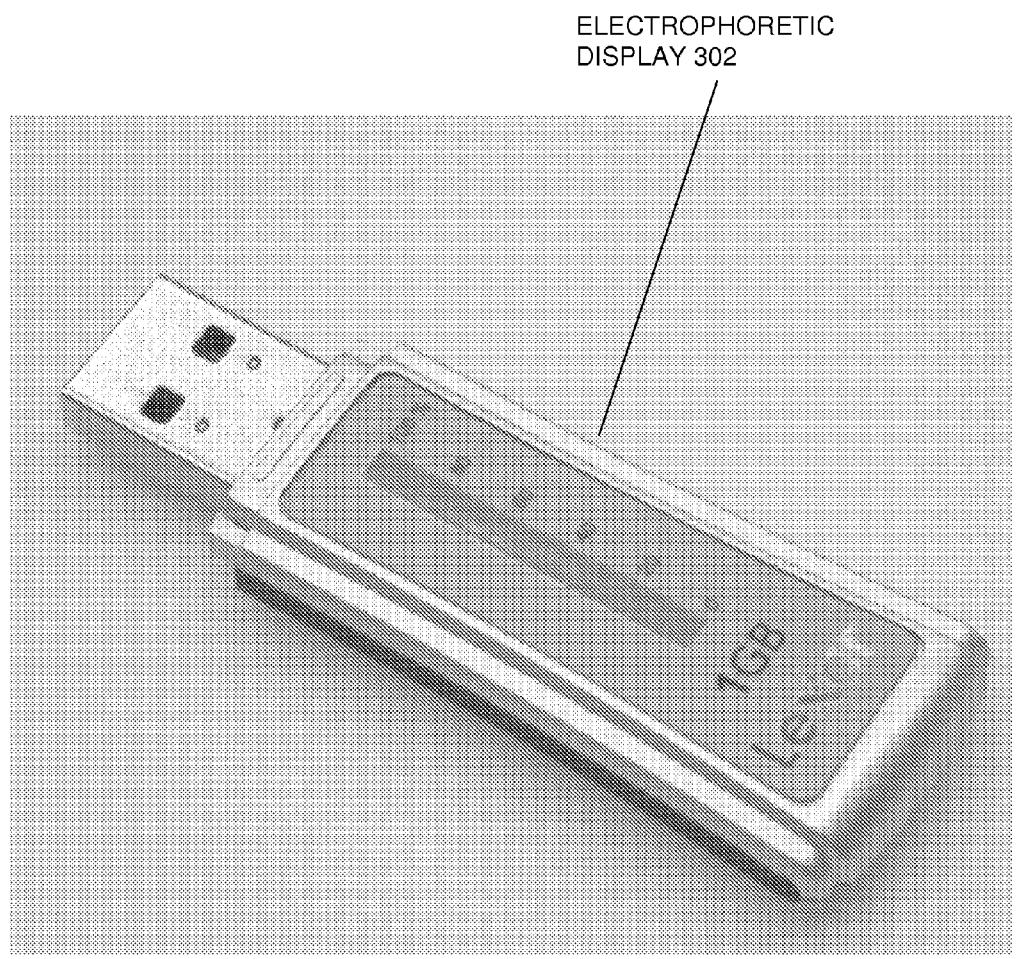
FIG. 3 illustrates a USB drive with electronic paper (E-INK, INC. TECHNOLOGY).

Unlike an LCD (liquid crystal display), which must refresh each pixel location about every 15 ms, electrophoretic displays do not require any refresh. The image is persistent and therefore is ideal as a dosimeter. A voltage is only needed to zero-out the dosimeter for re-use but not during operation. Electronic paper is cheap and has been integrated into consumer products. FIG. 3 shows a LEXAR® USB drive with an electronic paper from E-INK® as an indicator how much data is stored on the device.

Exemplary embodiments disclose a radiation dosimeter based on electrophoretic displays which can also be used as a bio/chemical sensor. (Table 1 compares different displays with respect to power consumption, resolution, weight, and image persistence.)

A first exemplary embodiment incorporates the general use of electronic paper 102 as an active sensing material for first responder applications and further combines the sensing material and a display material into one device. These sensors can also be used for chemical or biological sensing reactions that operate on charge transfer reactions. The scientific payoff is a system which has no power consumption during operation and ultra-light weight.

TABLE 1

Comparison of different displays with respect to power consumption, resolution, weight, and image persistence, used acronyms: CRT (cathode ray tube), LCD (liquid crystal display), PDP (plasma display panel), ppi (pixels per inch), dpi (dotes per inch).

|  | CRT | LCD | PDP | Paper | Electronic paper |
|---|---|---|---|---|---|
| Power Consumption | 700 W/m$^2$ | 400 W/m$^2$ | 700 W/m$^2$ | 0 | 0—during operation |
| Resolution | 130 ppi | 200 ppi | 100 ppi | 1200 dpi | 200 dpi |
| Weight | very high | high | high | paper | paper-like |
| Image persistence | No | No | No | Yes | Yes |

Because the radiation dosimeter is integrated into clothing, such as a uniform, the visual perception by the human eye of the contrast (or color or texture or pattern) change is important. Change detection is the apprehension of the change in the world around us. The ability to read and/or detect change is important in much of our everyday life, such as noticing a person entering the room. It is also important to distinguish between change and difference, where change refers to the transformation over time of a single structure, while in contrast, difference refers to a lack of similarity in the properties of two structures. The issue then is to clarify how these two notions differ. To the degree that they are not the same, trying to "spot the difference" between two side-by-side images will be a different activity than trying to read and/or detect the change in a pair of sequentially presented images. Because the detecting a difference is easier for the human eye, exemplary embodiments use a calibrated guide as a reference for the dosimeter.

FIG. 1 shows an optical micrograph of micro-spheres in electronic paper 102 and the basic principle of operation. Since the particles inside the spheres are electro-statically charged ionizing radiation can change the ink color contrast (gray-scale).

Figure 5A:
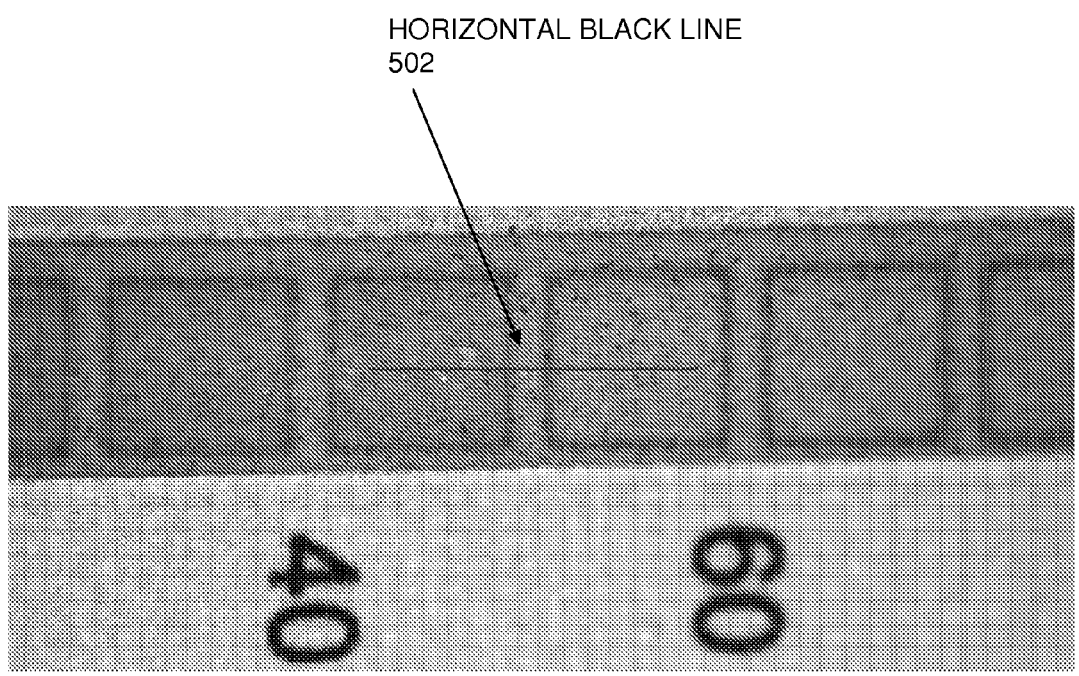
FIG. 5A illustrates electronic ink after irradiation (4.8 mR dose). There is a detectable difference in the gray-scale, see contrast scan along horizontal black line 502.
Figure 5B:
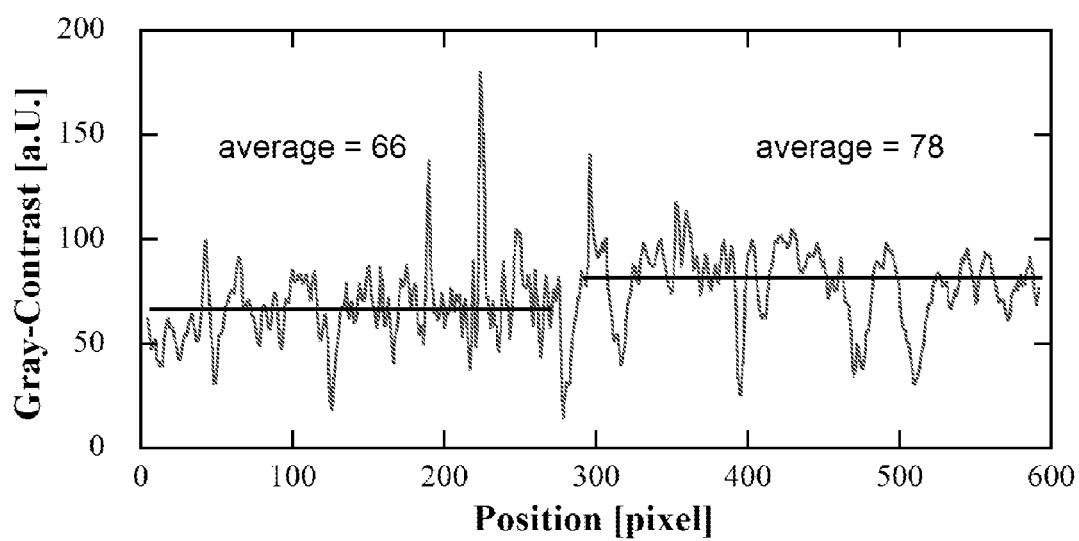
FIG. 5B illustrates a graph which plots contrast in arbitrary units on the vertical axis verses pixel position on the horizontal axis for electronic ink after irradiation (4.8 mR dose).

In accordance with exemplary embodiments, a method and system for a process and a product are manifested in FIG. 5A, such that the principle of detection is schematically shown in FIG. 5A.

Referring to FIG. 5A, the detection occurs within the particles in the micro-sphere. The charge of the particles changes which leads to a color (gray-scale) change. The color change is related to the arrangement of the particles within a micro-sphere (micro-container, such as a PDMS micro container 602). This arrangement is a function of the particle mobility, zeta potential and charge per particle. The zeta potential is the potential difference between the dispersion medium and the stationary layer of fluid attached to the dispersed particle. Hence all these parameters will determine the overall color of the micro-sphere, such that particle mobility, zeta potential and viscosity of the surrounding liquid determine the charge per particle to allow a color change (move it within the micro-sphere).

The internal phase of the micro-sphere (i.e., micro-container, such as the PDMS micro container 602) was prepared as a mixture of different charged particles in a stable colloidal solution. Poly-condensation/formation of the micro-sphere is formed from the colloidal solution. In exemplary embodiments, $TiO_2$ is a white particle. For optimal radiation detection high-Z materials are desired, where Z is the atomic number of the particle element used. Different high-Z semiconducting particles were tested within the micro-sphere, such as CdSe and CdTe semiconducting materials. (CdTe quantum dots micro-particles all commercially available.) Besides different particles, the micro-sphere material and the liquid were varied and studied.

The charge needed to "flip" one $TiO_2$ particle can be as low as $q=2.6\times10^{-18}$ C=16 e$^-$ for a given solution.

Calibration of the dosimeter device is obtained by systematically varying these parameters as function of radiation dose under test. During testing of high energy (ionizing) radiation dosages, a given dose was systematically changed. Calibrated standard radiation detectors will simultaneously record the dose and provide a reference value. During testing of high energy radiation dosages, the color (gray-scale) change of the device was recorded by a CCD (charge couple device) imager. Image processing software quantified the color change. Thus, in exemplary embodiments, the actual dosimeter device has a calibrated gray-scale next to the electronic paper 102 giving the agent/operator the ability to easily compare and detect dosage strengths.

An incoming gamma-ray (such as gamma radiation 402) interacts with a particle inside the micro-container (such as the PDMS micro container 602) by generating a recoil electron 404 (and/or a hole). Since the recoil electron 404 physically leaves the particle, the particle charges up, depending on the dose.

The particles in the micro-container (such as the PDMS micro container 602) form a stable colloidal solution. The property of the solution is directly correlated to the operation and sensitivity of the device. The liquid layer surrounding the particle exists as two parts; an inner region (Stern layer) where the ions are strongly bound and an outer (diffuse) region where the ions are less firmly associated. Within the diffuse layer, there is a notional boundary inside which the ions and particles for a stable entity. When a particle moves (such as due to gravity or an external electric field), ions within the boundary move the particle. Those ions beyond the boundary stay with the bulk dispersant. The potential at this boundary (surface of hydrodynamic shear) is the zeta potential. The magnitude of the zeta potential gives an indication of the potential stability of the colloidal system and their mobility The general dividing line between stable and unstable suspensions is generally taken at either +30 or −30 millivolts (mV). Particles with zeta potentials more positive than +30 mV or more negative than −30 mV are normally considered stable. The zeta potential can be adjusted by the solution parameters, for example the pH value ad the overall electrolyte conductivity modify the zeta-potential. An important consequence of the existence of electrical charges of particles is that they interact with an applied electric field (such as supplied by a negative electric charge 202 or a sensitive electric charge 210). These effects are collectively defined as electrokinetic effects. There are two effects which affect the particle's motion in the micro-container (such as the PDMS micro container 602): The dominating force is electrophoreses: the movement of a charged particle relative to the liquid it is suspended in under the influence of an applied electric field. Furthermore, to a much less extent, dielectrophoresic force plays a role: Dielectrophoresis describes the movement of polarizable particles in a non-uniform electric field. Some non-uniform electric fields can fore due to shape of the micro-container (such as the PDMS micro container 602).

Electronic paper 102 from E-Ink® is irradiated, using a $^{137}$Cs (i.e., Caesium-137) source. After refreshing of the electronic paper 102 a visible difference in the gray-scale was detectable, see FIG. 1, FIG. 6A, and FIG. 6B. Since "ghosting" (a temporary "burn-in" of an image) is not a problem for electronic paper 102 this effect was caused by the irradiation. This simple experiment shows that electronic paper 102, which is non-optimized, is sensitive to high energy radiation.

In order to estimate the response to a radiation dose, the following calculation was carried out, assuming a high ionizing radiation with an energy of 222 keV (mean photon energy of typical gamma-ray background) and a dose of 100 mRem. For simplicity, a layer of particles with a thickness of 1 mm and a 10% fill factor (ratio of particle and solution volume) was estimated. The response to two different types of particles W (Tungsten, density 19.35 g/cm$^3$) and CdTe (Cadmium Telluride, density 5.86 g/cm$^3$) were calculated. Furthermore, it was assumed that only the kick-out of the recoil electron charged the particle. Based on estimated dose and radiation energy roughly 5,400 particles for W and 1,600 for CdTe will move within a micro-container (such as the PDMS micro container 602). (This number also depends on the zeta potential, solution viscosity, and particle weight. It was estimated that approximately 16 electrons per particle are needed following B. Comiskey et al.). For both cases CdTe and W, this change is detectable by the naked eye.

Because the dosimeter can be integrated within or as part of a uniform, the visual perception by the human eye of the contrast (or color) change is important. Change detection is the apprehension of change in the world around us. The ability to detect change is important in much of everyday life—for example, noticing a person entering the room. It is also important to distinguish between change and difference. Change refers to the transformation over time of a single structure. In contrast, difference refers to a lack of similarity in the properties of two structures. The issue then is to clarify how these two notions differ. To the degree that they are not the same, trying to "spot the difference" between two side-by-side images will be a different activity than trying to detect the change in a pair of sequentially presented images. Since detecting a difference is easier for the human eye, a calibrated color guide can be used as a reference for the dosimeter, according to I. Chen, "Particle charges in non-aqueous colloidal dispersions" 1996.

Figure 6A:
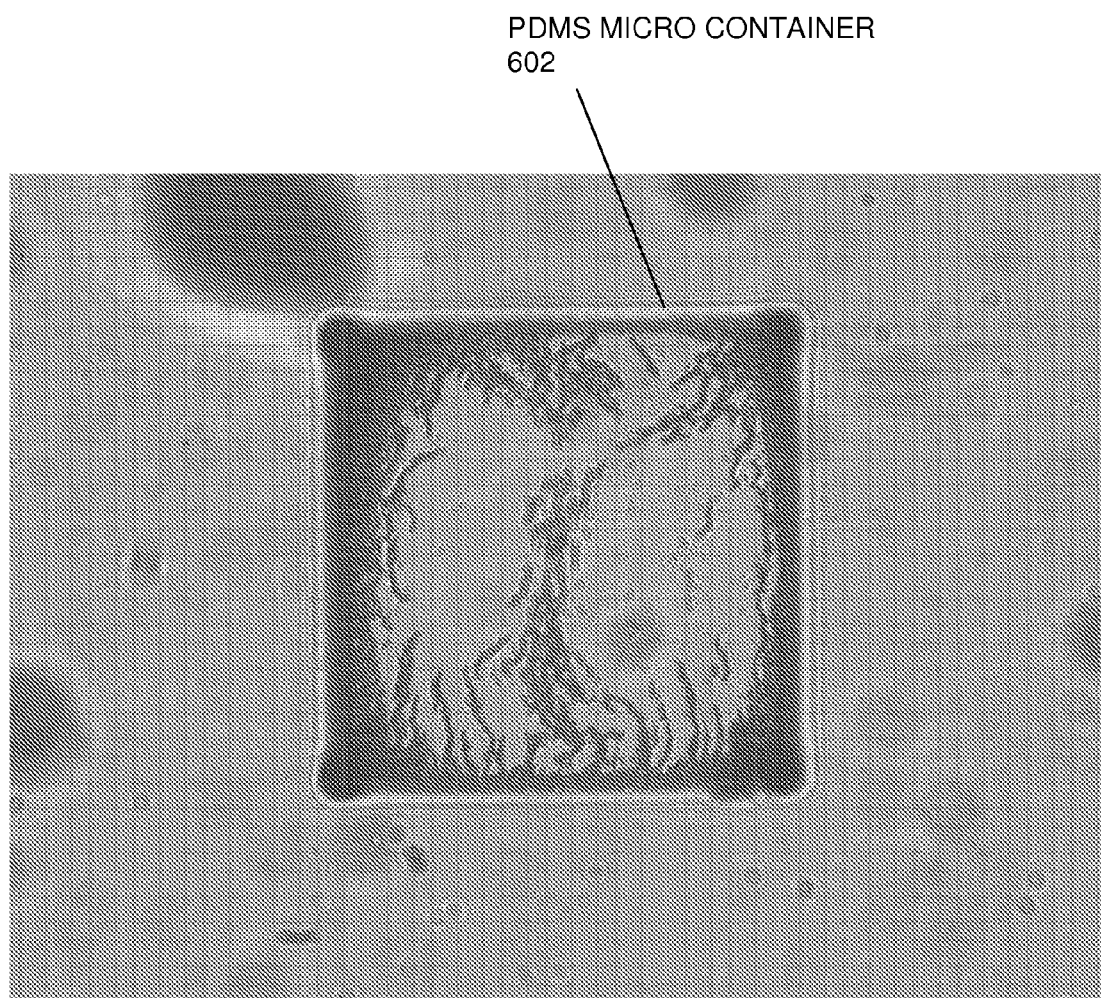
FIG. 6A illustrates Magnetic particles inside a polydimethylsiloxane (PDMS) micro-container, with no magnetic field applied.
Figure 6B:
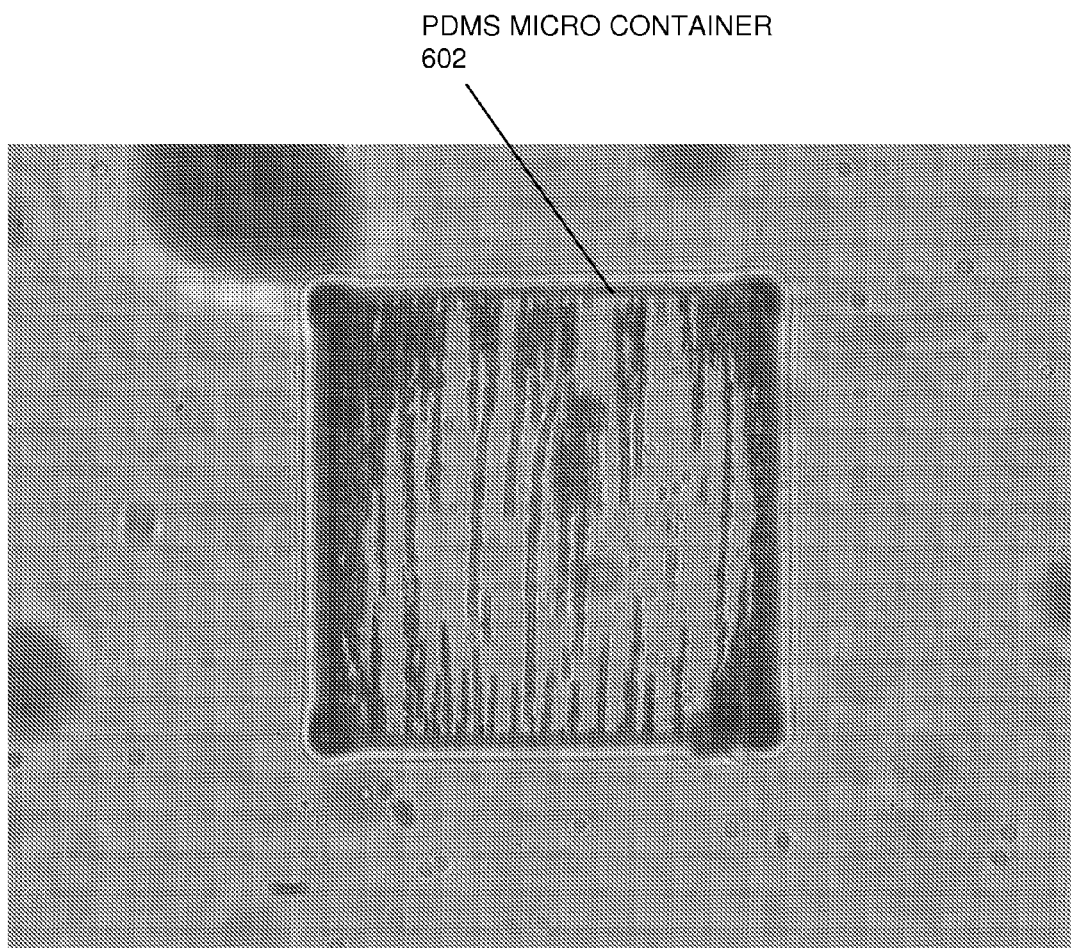
FIG. 6B illustrates Magnetic particles inside a PDMS micro-container, with a magnetic field applied.

Micro-containers (such as the PDMS micro container 602) are fabricated in PDMS (polydimethylsiloxane), see FIG. 6A and FIG. 6B. The micro containers (such as the PDMS micro container 602) are made by micro-molding from a silicon master. The micro containers (such as the PDMS micro container 602) are filled with a water based dielectric solution with suspended magnetic beads. The diameter of one bead is approximately 2 μm. The beads are moved within the micro containers (such as the PDMS micro container 602) by applying an external magnetic field.

Figure 9:
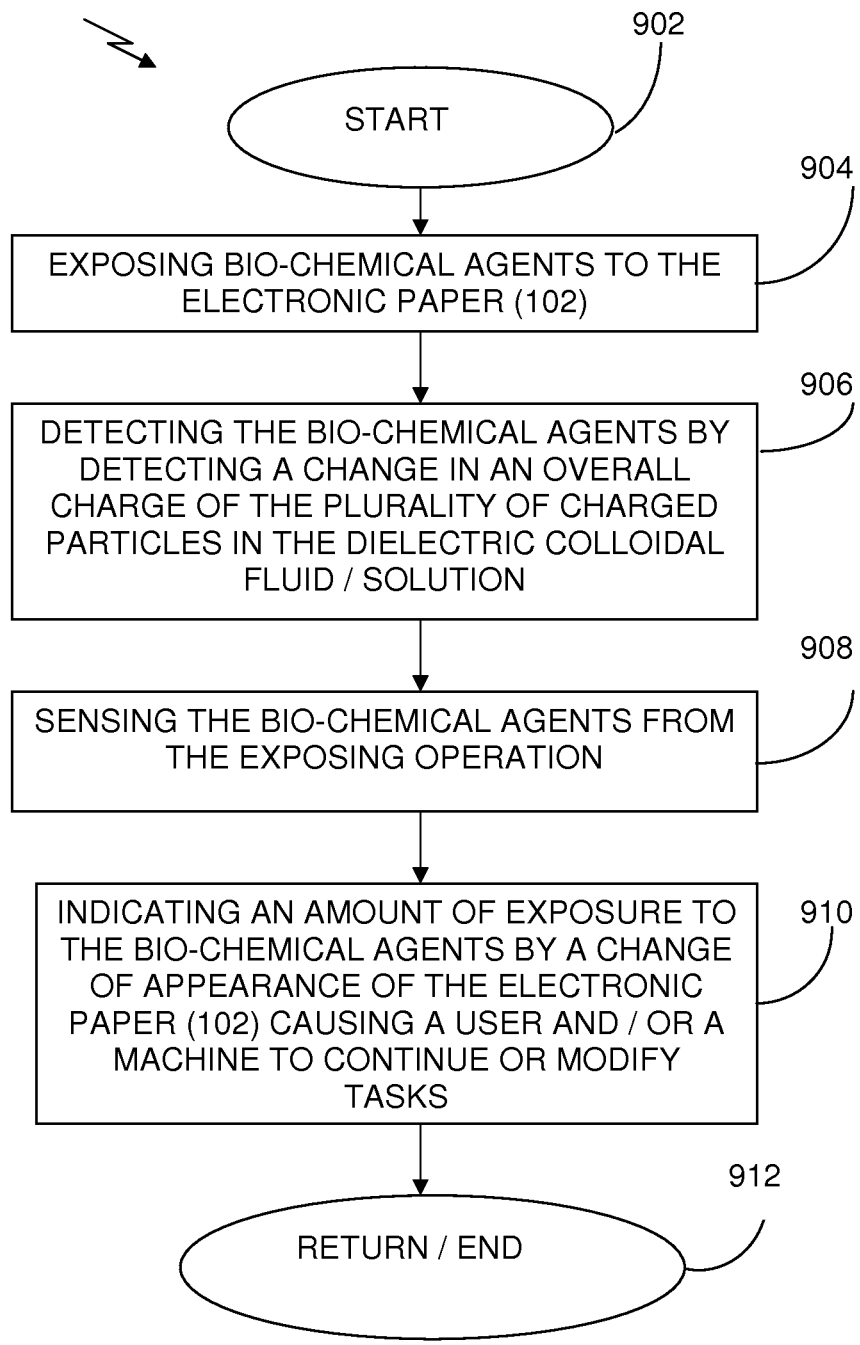
FIG. 9 illustrates a method 900 of detecting exposure to bio-chemical agents, using electronic paper.

In a second exemplary embodiment, in regard to semiconducting particles, the recoil electrons will generate extra charges (electron-hole pairs), see FIG. 9 and FIG. 10. By using Redox (reduction-oxidation) reactions, the excess holes are captured. These reactions are widely used in liquid semiconductor quantum dot solar cells (see J. H. Bang, P. V. Kamat, "Quantum dot sensitized solar cells: a tale of two semiconductor nano-crystals: CdSe and CdTe", American Chemical Society Nano, vol. 3, pp.1467-1476, 2009; S. H. Shin, J. M. Arias, M. Zandian, J. G. Pasko, J. Bajaj, R. E. DeWames, "Minority carrier lifetime and diffusion length in HgTe/CdTe", Appl. Phys. Lett., vol. 61, pp. 1196-1170, 1992; A. B. Ellis, S. W. Kaiser, M. S. Wrighton, "Visible Light to Electrical Energy Conversion. Stable Cadmium Sulfide and Cadmium Selenide Photoelectrodes in Aqueous Electrolytes", J. Am. Chem. Soc., vol. 98, pp. 1635-1637, 1976; and A. B. Ellis, S. W. Kaiser, M. S. Wrighton, "Optical to Electrical Energy Conversion. Characterization of Cadmium Sulfide and Cadmium Selenide Based Photo-electrochemical Cells", J. Am. Chem. Soc., vol. 98, pp. 6855-6866, 1976). Any captured hole increases the dosimeter sensitivity. In an ideal situation this sensitivity can be adjusted by the number of captured holes. One example is the sulfide/polysulfide ($S^{2-}/S_n^{-2}$) redox couple which has been extensively studied with CdTe and CdSe (see P. M. Lessner, F. R. McLarnon, J. Winnick, E. J. Cairns, "The Dependence of Aqueous Sulfur-Polysulfide Redox Potential on Electrolyte Composition and Temperature", J. Electrochem. Soc., vol. 140, pp. 1847-1849, 1993; G. Hodes, B. Miller, "Thermodynamic Stability of II-VI Semiconductor—Polysulfide Photo-electrochemical Systems", J. Electrochem. Soc., vol. 133, pp. 2177-2180, 1986; and H. L. Guo, X. P. Zhao, "Preparation of a kind of red encapsulated electrophoretic ink", Optical Materials, vol. 26, pp. 297, 2004).

According to a third embodiment, the general sensing schema, moving particles within the micro-container (such as the PDMS micro container 602), are applied to sensing biological and/or chemical agents. In order for the biological and/or chemical agents to react with the particles, a semipermeable membrane or container enclosure is needed. The semipermeable membrane also adds additional selectivity.

Furthermore, the mobility of the particles within the micro-container is a function of the zeta potential. Sensing can also be accomplished by modifying the zeta potential, e.g. change in pH value, ion concentration change.

Additionally, the detection sensitivity can be estimated for chemical agents, as follows: Organophosphate (OP) compounds are significant environmental and food chain pollutants because they are used intensively as pesticides, insecticides, and chemical-warfare agents. OP can react with functionalized carbon particles in a two electron reaction, according to G. Liu, Y. Lin "Electrochemical stripping analysis of organophosphate pesticides and nerve agents", Electrochem. Comm., vol. 7, pp. 339-343, 2005). Carbon particles have been used as a particle material for electrophoretic displays. Considering that the OP molecules can be fully absorbed by the dielectric fluid of a micro-container, a response of moving 5,000 particles would correlate to a concentration of approximately 50 ppb (parts per billion) of agent molecules in a micro-capsule.

According to the first embodiment, a method 800 of detecting, sensing and indicating exposure to a high energy ionizing radiation, (on and/or using) an electrophoretic display 302 having an electronic paper 102 is disclosed herein. The electronic paper 102 contains a plurality of transparent micro-containers, and residing in the plurality of transparent micro-containers are a plurality of positively charged black particles, such as black micro particles 204 and a plurality of negatively charged white particles, such as white micro particles 208. The visual appearance of the electronic paper 102 depends on a position of the plurality of charged particles, where the different charged particles are made of at least two different types of semiconducting materials having oppositely charged states. The size of the charged particles ranges from about 200 nm up to about 5 micrometers.

Figure 8:
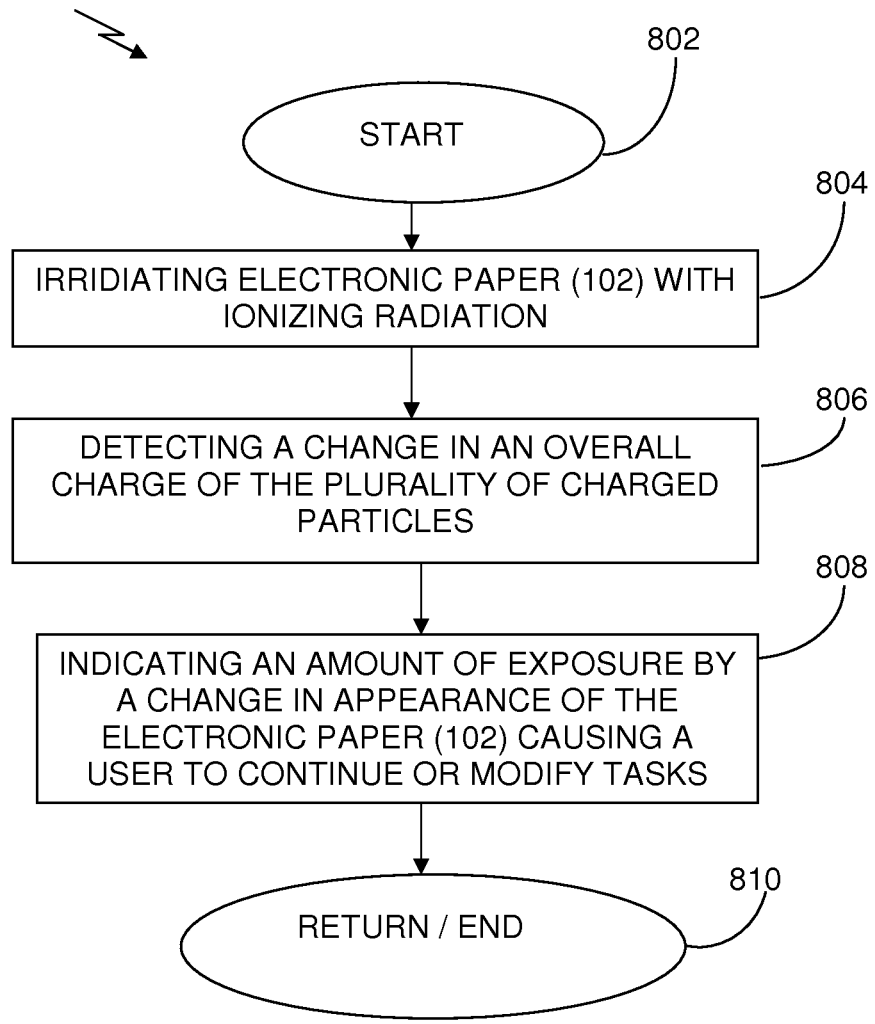
FIG. 8 illustrates a method 800 of detecting exposure to radiation, using electronic paper.

Referring to FIG. 8 and FIG. 3, and according to the first exemplary embodiment, at an operation "start" 802 (hereafter "the operation 802"), the electrophoretic display 302 is either manually or automatically (i.e., automatically, when the method 800 is implemented with a robotic device) placed in proximity to high ionizing radiation.

Referring to FIG. 8 and FIG. 1, the method 800, after the start 802 operation, comprises irradiating, in an "irradiating electronic paper (102) with ionizing radiation" 804 operation (hereafter "the operation 804"), where the high energy ionizing radiation irradiates the electronic paper 102 containing the plurality of transparent micro-containers.

Figure 2:
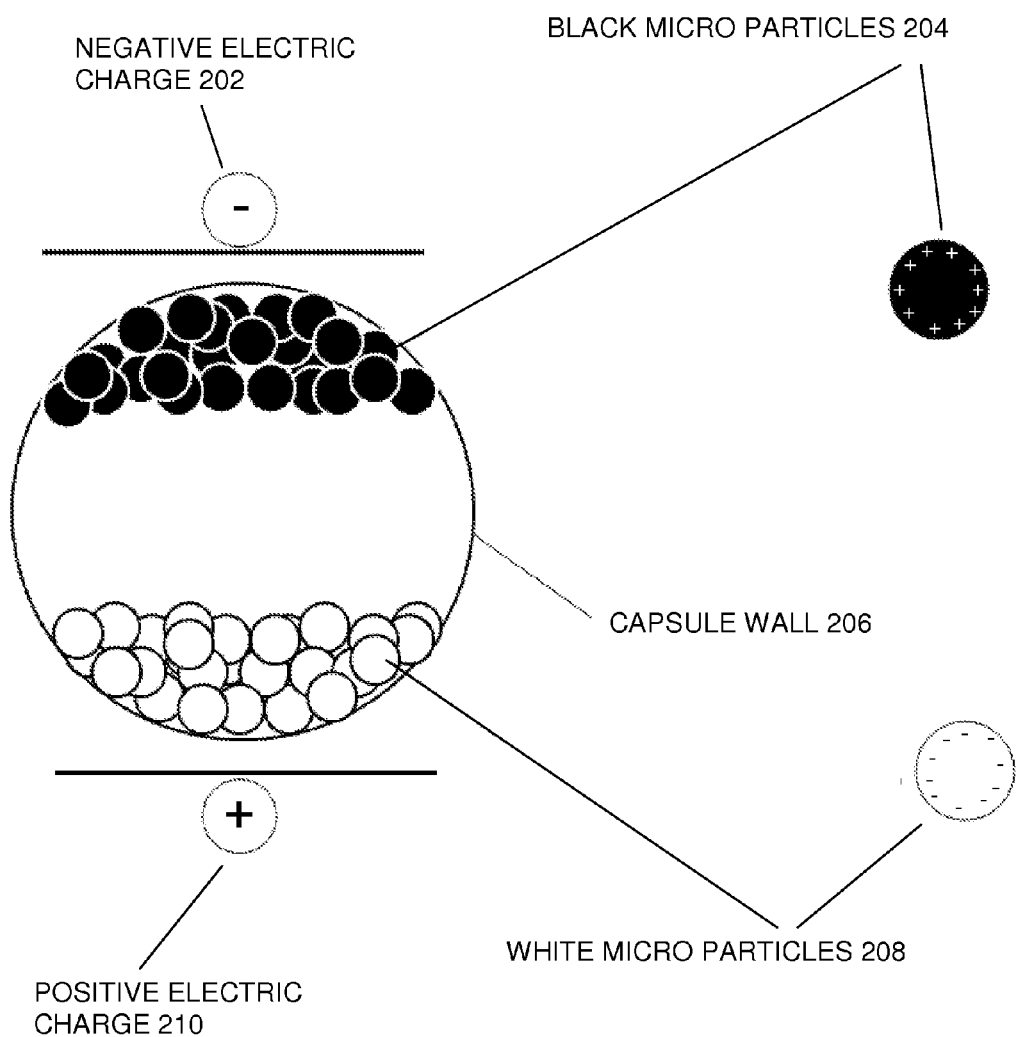
FIG. 2 illustrates the basic operation principle of electronic paper, of that being the principle of how differently charged particles in a micro-particle are separated.

Referring to FIG. 1, FIG. 2 and FIG. 8, the method 800 further comprises a "detecting a change in an overall charge of the plurality of charged particles" 806 operation (hereafter "the operation 806"), for automatically reading and/or detecting, sensing and indicating exposure to a high energy ionizing radiation further comprising detecting, by the electronic paper 102. In the operation 806, a change in the overall charge of the plurality of charged particles is accomplished, by either interacting, in an interacting operation, the high energy radiation with one or more of a positively charged black particle from the plurality of positively charged black particles, such as black micro particles 204, and one or more of a negatively charged white particle from the plurality of negatively charged white particles such as white micro particles 208, and/or either interacting with the surroundings of one or more positively charged black particle from the plurality of positively charged black particles, such as black micro particles 204, and/or interacting with the surrounding of the one or more negatively charged white particle from the plurality of negatively charged white particle, such as white micro particles 208, caused by irradiating the electronic paper 102 with the high energy radiation in the irradiating operation, i.e., the operation 804. The negatively charged white particle, such as white micro particles 208 can be either $TiO_2$ particles, CdSe quantum dots or CdTe quantum dots; and where the overall charge of the charged particles is changed by modifying the zeta potential—the zeta potential is defined as the potential at the boundary of the surface of hydrodynamic shear.

Further, the method of detecting, sensing, and indicating exposure to a high energy ionizing radiation comprises generating either a recoil electron 404 and/or a hole from the one or more positively charged black particle from the plurality of positively charged black particles, resulting from interacting, in the interacting operation, by the high energy ionizing radiation with one or more of the positively charged black particle from the plurality of positively charged black particles, such as the black micro particles 204, and one or more of the negatively charged white particle from the plurality of negatively charged white particles, such as the white micro particles 208.

Referring to FIG. 1, FIG. 6A, FIG. 6B, and FIG. 8, furthermore according to the first exemplary embodiment, the method of detecting, sensing, and indicating exposure to a high energy ionizing radiation includes an "indicating an amount of the exposure by a change in appearance of the electronic paper (102) causing a user to continue or modify tasks" 808 operation (hereafter "the operation 808"), by the electrophoretic display having electronic paper, by indicating a change in the appearance of the electronic paper, based on changing, within the micro-container, such as the PDMS micro container 602, the location and the charge of one or more of the positively charged black particle from the plurality of positively charged black particles to one or more of the negatively charged black particle; and further changing, within the micro-container, the location and the charge of one or more of the negatively charged white particle from the plurality of negatively charged white particles to the positively charged white particle resulting from the particle changing operation. The change in appearance of the electronic paper can be manifested by a change in color or the electronic paper, and/or a change in texture of the electronic paper, and/or a change in contrast (i.e., gray-scale, black and white and/or washout), and/or the change in appearance of the electronic paper can be manifested by a change in pattern exhibited and/or location of particles on the electronic paper.

The change in appearance, color, and/or location of particles correlates with overall high energy radiation dosage and sensitivity levels that the electronic paper is exposed to. Furthermore, the change in appearance, color, and/or location of particles can be visible to a human eye, thereby providing instantaneously, in real time, an indication of exposure, to an agent and/or operator, indicating an amount of exposure to the high energy ionizing radiation. The agent and/or operator can be either a human and/or a non-human automated and/or robotic agent/operator.

The operation 808 further includes sensing by the electronic paper 102 by either changing, in a particle changing operation, a location and a charge of one or more of the positively charged black particle from the plurality of positively charged black particles, such as the black micro particles 204, to one or more of a negatively charged black particle and/or changing a location and a charge of one or more of the negatively charged white particle from the plurality of negatively charged white particles to a positively charged white particle, such as the white micro particles 208, resulting from either generating a recoil electron 404 and/or generating a hole, such as, generating extra charges.

Furthermore, according to exemplary embodiments, the electronic paper 102 of the electrophoretic display 302 can be refreshed by applying a voltage to zero-out the electrophoretic display enabling the electrophoretic display 302, after one use, to be used repeatedly to provide instantaneous indications of the amount of exposure to the high energy radiation. The electrophoretic display 302 can be an ultra-low power display using power only when particles are moved within the micro-container. The electrophoretic display 302 is light weight, and can be either attached to the agent and/or operator or integrated into clothing and worn on clothing used by the agent/operator. The change in the appearance of the electrophoretic display, when noticed by the user/agent and/or operator, or detected by an automated reading and/or detecting apparatus causes the user/agent/operator to either continue or modify tasks in order to manually and/or automatically maintain a habitable environment, where the habitable environment can comprise a safe environment on Earth, in the Atmosphere or in space or underground, and in, or under the surface of water for humans to be able to continue life functions and/or where human life functions are not irreversibly damaged or affected by exposure to high energy radiation levels. Also, the habitable environment can be an environment, such as mentioned above where instruments and machines can survive and operate effectively notwithstanding the effects of high energy radiation levels.

At an operation Return/End 810, (hereafter "the operation 810"), the operations of the method 800 can be either executed manually or automatically (automatically, when flexible electronics including one or more computer processors, computer memories and program code are implemented in the dosimeter) for either returning to any of the above operations and/or sub operations and iteratively performing any one or more of the operations and/or sub operations and/or refreshing the electronic paper 102 for re-use, until the operations of the method 800 are completed, resulting in indicating an amount of exposure to the high energy ionizing radiation.

Referring to FIG. 1, FIG. 6A, FIG. 6B, and FIG. 9, according to a second embodiment, a method 900 of detecting, sensing and indicating an exposure to a plurality of bio-chemical agents involving charge transfer, (on and/or using) an electrophoretic display having electronic paper, is disclosed herein. The electronic paper 102 contains a plurality of microcontainers such as the PDMS micro container 602, and the plurality of microcontainers have and/or can be a plurality of transparent semipermeable membrane micro-sphere enclosures. Residing in the plurality of transparent semipermeable membrane micro-sphere enclosures are a plurality of positively charged functionalized black carbon particles and a dielectric colloidal fluid. This fluid can be a solution formed by the plurality of charged particles. Furthermore, a visual appearance of the electronic paper depends on a position of the plurality of charged particles, the method of detecting, sensing and indicating the exposure to the plurality of bio-chemical agents comprises exposing, the plurality of bio-chemical agents, in an exposing operation, to the electronic paper 102 containing the plurality of transparent semipermeable membrane micro-sphere enclosures.

Referring again to FIG. 3 and FIG. 9, according to the second exemplary embodiment, at an operation "start" 902 (hereafter "the operation 902"), the method 900 is initiated when the electrophoretic display 302 is either manually or automatically (i.e., automatically, when the method 900 is implemented with a robotic device) placed in proximity to bio-chemical agents.

Referring to FIG. 1, FIG. 6A, FIG. 6B, and FIG. 9, the method 900, after the operation 902 is initiated, comprises exposing, in an "exposing bio-chemical agents to the electronic paper (102)" 904 operation (hereafter "the operation 904"), where the electronic paper 102 containing the plurality of transparent micro-containers (such as the PDMS micro container 602) is exposed to bio-chemical agents.

Referring to FIG. 9, according to the second embodiment, in a "detecting the bio-chemical agents by detecting a change in an overall charge of the plurality of charged particles in the dielectric colloidal fluid/solution" 906 operation (hereafter "the operation 906") the method 900 comprises detecting one or more of the plurality of bio-chemical agents by the electrophoretic display, by changing the overall charge of the plurality of charged particles, by either absorbing the plurality of bio-chemical agents, in an absorbing operation, or by absorbing the plurality of positively charged functionalized black carbon particles in the dielectric fluid and/or solution in a two electron reaction of the plurality of positively charged functionalized black carbon particles, caused by exposing the electronic paper to the plurality of bio-chemical agents in the exposing operation.

The overall charge of the charged particles is changed by modifying the zeta potential, where the potential is the potential at the boundary of the surface of hydrodynamic shear.

The method 900 further comprises sensing and indicating the exposure to a plurality of bio-chemical agents.

Referring to FIG. 2, FIG. 3, and FIG. 9, in an operation "sensing the bio-chemical agents from the exposing operation 908 (hereafter "the operation 908"), the method 900 senses the exposing using the electrophoretic display 302, which is accomplished by generating a two electron reaction of the plurality of positively charged functionalized black carbon particles (such as black micro particles 204), caused by exposing the electronic paper 102 to the plurality of bio-chemical agents in the exposing operation and either changing, in a particle changing operation, a location of one or more of the plurality of positively charged functionalized black carbon particles (such as black micro particles 204), or changing a charge of one or more of the plurality of positively charged functionalized black carbon particles (such as black micro particles 204), by the two electron reaction in the dielectric fluid.

Referring to FIG. 1, FIG. 2, FIG. 3, FIG. 6A, FIG. 6B, and FIG. 9, the method 900 continues with an "indicating an amount of exposure to the bio-chemical agents by a change of appearance of the electronic paper (102) causing a user and/or a machine to continue or modify tasks" 910 operation (hereafter "the operation 910") by indicating, by the electrophoretic display 302, having the electronic paper 102, an amount of the exposure to the plurality of bio-chemical agents. The indicating is manifested by a change in the appearance and/or color of the electronic paper 102, based on changing, within the plurality of transparent semipermeable membrane micro-sphere enclosures (such as the PDMS micro container 602), the location and the charge of one or more of the plurality of positively charged functionalized black carbon particles (such as the black micro particles 204). The appearance or color or location of the plurality of positively charged functionalized black carbon particles correlates with overall high dosages of bio-chemical agents and sensitivity to the plurality of bio-chemical agents by the electronic paper 102. The change in appearance/color and/or location of the plurality of positively charged functionalized black carbon particles (such as the PDMS micro container 602) can be visible to a human eye, thereby providing instantaneously in real time an indication, to an agent/operator, of an amount of exposure to the plurality of bio-chemical agents.

Referring to FIG. 9, at an operation Return/End 912, (hereafter "the operation 912"), the operations of the method 900 can be either executed manually or automatically (automatically, when flexible electronics including one or more computer processors, computer memories and program code are implemented in the dosimeter) for either returning to any of the above operations and/or sub operations and iteratively performing any one or more of the operations and/or sub operations and/or refreshing the electronic paper 102, until the operations of the method 900 are completed, resulting in indicating an amount of exposure to bio-chemical agents.

Figure 7A:
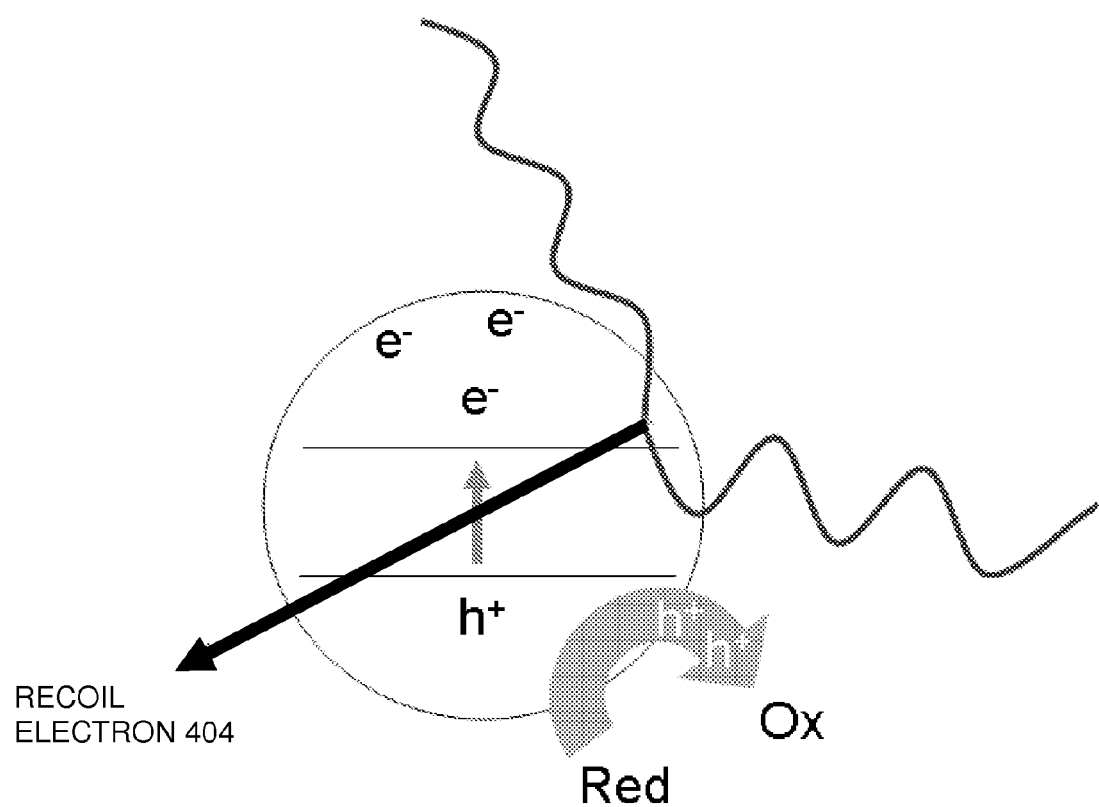
FIG. 7A illustrates how recoil electrons generate secondary electron hole pairs within the semiconducting particles. In order to achieve a net-charging, the holes react with a Redox (reduction-oxidation) couple in the surrounding solution.
Figure 7B:
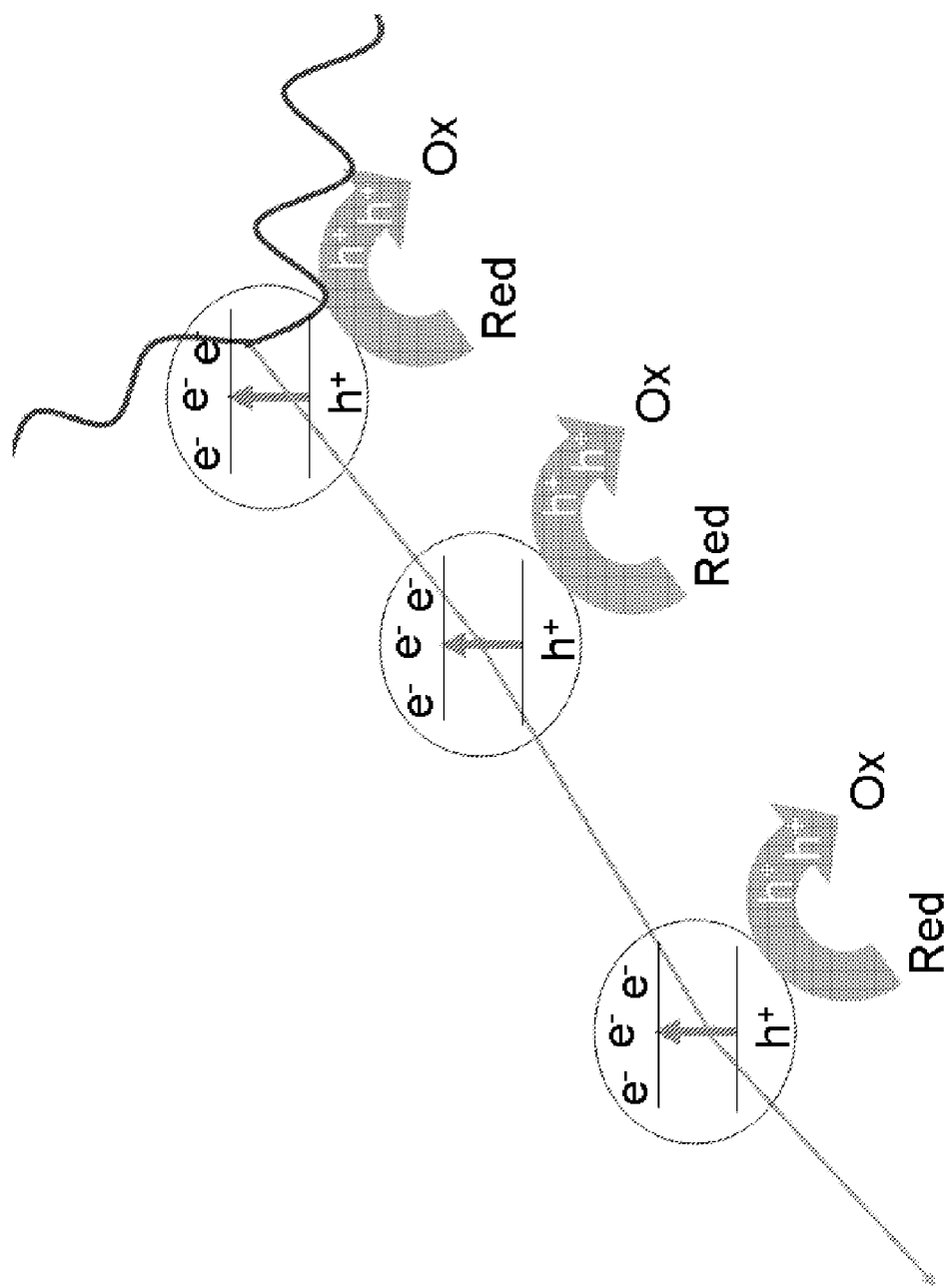
FIG. 7B illustrates how recoil electrons also generate charge in neighboring particles. The generate holes will be "collected" by the redox couple, leaving the electrons to charge the particles.

In addition, a change in the overall charge of the plurality of charged particles is amplified by a redox reaction (see FIG. 7A and FIG. 7B).

The sizes of the plurality of charged particles can range from about 200 nm up to about 5 micrometers.

The plurality of charged particles are made of a semiconducting compound material. The electrophoretic display 302 is integrated with flexible electronics. Flexible electronics, also known as flex circuits, are described by a technology for assembling electronic circuits by mounting electronic devices on flexible plastic substrates, such as polyimide and PEEK (polyether ether ketone) film. Additionally, flex circuits can be screen printed silver circuits on polyester. The flexible electronics can contain one or more components, such as computer processors, memories and communications circuits.

Furthermore, the plurality of microcontainers (such as the PDMS micro container 602) can have a rectangular shape and can be microspheres.

Further, according to the second exemplary embodiment, the electronic paper 102 implemented in the electrophoretic display 302 is refreshed by applying a voltage to zero-out the electrophoretic display 302 enabling the electrophoretic display 302 to be used repeatedly to provide instantaneous indications of the amount of exposure to the plurality of bio-chemical agents. The electrophoretic display 302 is an ultra-low power display using power only when particles are moved within the micro-container. The electrophoretic display 302 is light weight, and the electrophoretic display 302 is either attached to the agent and/or operator or the electrophoretic display 302 is integrated into clothing of the user and/or operator and further, can be worn on clothing used by the agent and/or operator. The change in the appearance of the electronic paper 102 in the electrophoretic display 302, when noticed by the user/agent/operator, or detected by an automated reading/detecting apparatus causes the user/agent/operator to either continue tasks or modify tasks in order to manually and/or automatically maintain a habitable environment, where the habitable environment can comprise a safe environment on Earth, in the Atmosphere or in space or underground, and in, or under the surface of water for humans to be able to continue life functions and/or where human life functions are not irreversibly damaged or affected by exposure to chemical, biological and/or bio-chemical events and/or agents. Also, the habitable environment can be an environment, such as mentioned above, where instruments and machines can survive and operate effectively notwithstanding the effects of chemical, biological and/or radiological events and/or agents.

Referring to FIG. 1, FIG. 3, FIG. 6A, FIG. 6B, and FIG. 10A, according to a third exemplary embodiment, which is a combination of the first and second exemplary embodiments, a method 1000 is implemented using the electrophoretic display 302 having electronic paper 102 as a dosimeter to detect, sense and indicate/display exposure to either and/or one or more of both high energy radiation and/or a plurality of bio-chemical agents. Such a dosimeter using the electrophoretic display 302 having electronic paper 102, where the electronic paper 102 can be a reusable electronic paper combination detector, sensor and indicator, includes either a plurality of transparent micro-containers (such as the PDMS micro container 602) or it can have a plurality of transparent semipermeable membrane micro-sphere enclosures (such as the PDMS micro container 602).

Figure 10A:
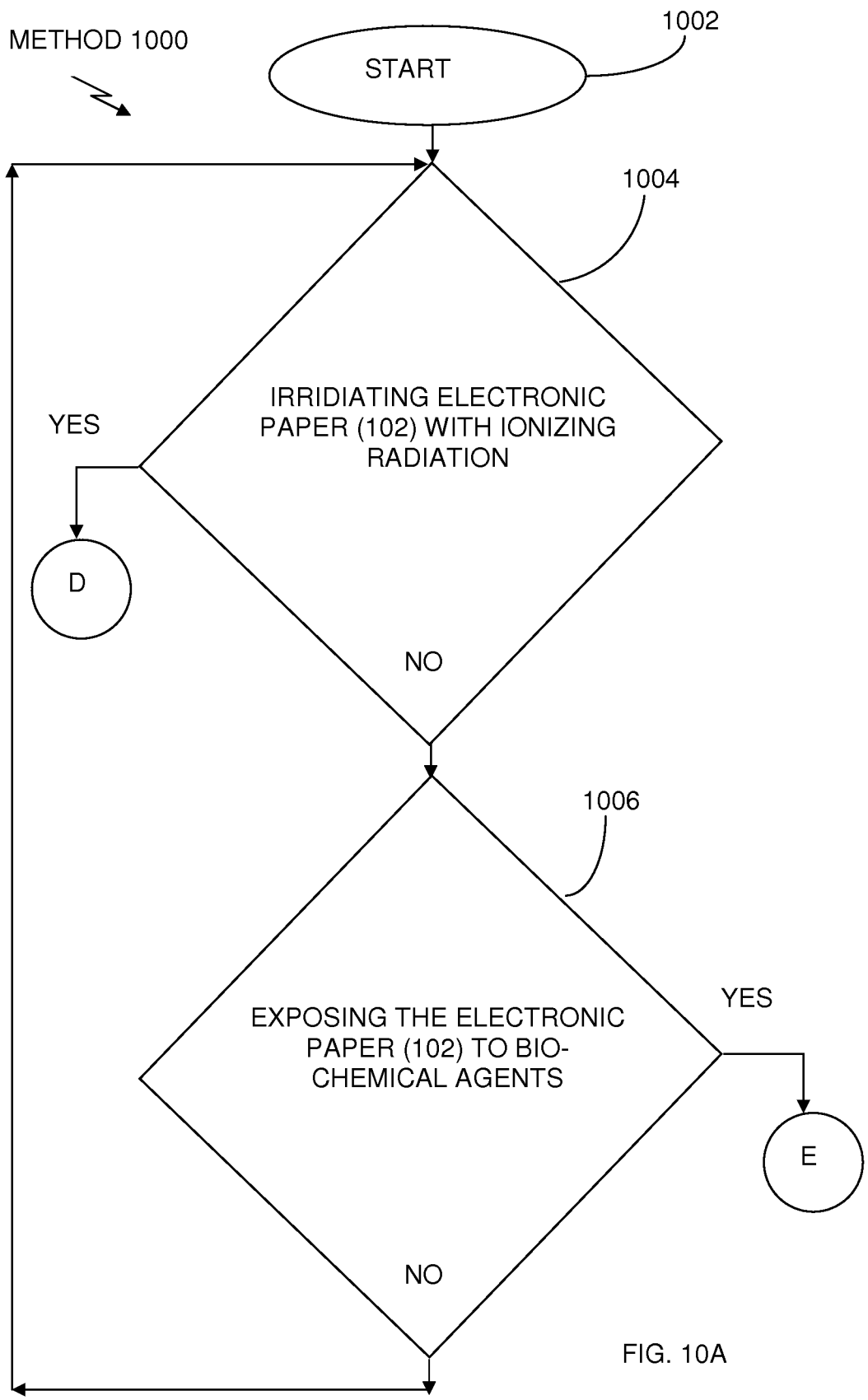
FIG. 10A illustrates a method 1000 of detecting either exposure to radiation, using electronic paper and/or detecting exposure to bio-chemical agents, using electronic paper.

Referring to FIG. 3 and FIG. 10A, at an operation "start" 1002 (hereafter "the operation 1002"), the method 1000 is initiated when the electrophoretic display 302 is either manually or automatically (i.e., automatically, when the method 1000 is implemented with a robotic device) placed in proximity to either high energy radiation and/or one or more bio-chemical agents.

Referring to FIG. 1, and FIG. 10A, at an operation of "irradiating electronic paper (102) with ionizing radiation" 1004 (hereafter "the operation 1004"), when the electrophoretic display 302 is exposed to high energy radiation, the method 1000 continues to a radiation detecting operation and/or the method 1000 continues to an operation of exposing the electronic paper 102 to one or more bio-chemical agents, if significant levels of radiation are not in proximity to the electronic paper 102.

Figure 10B:
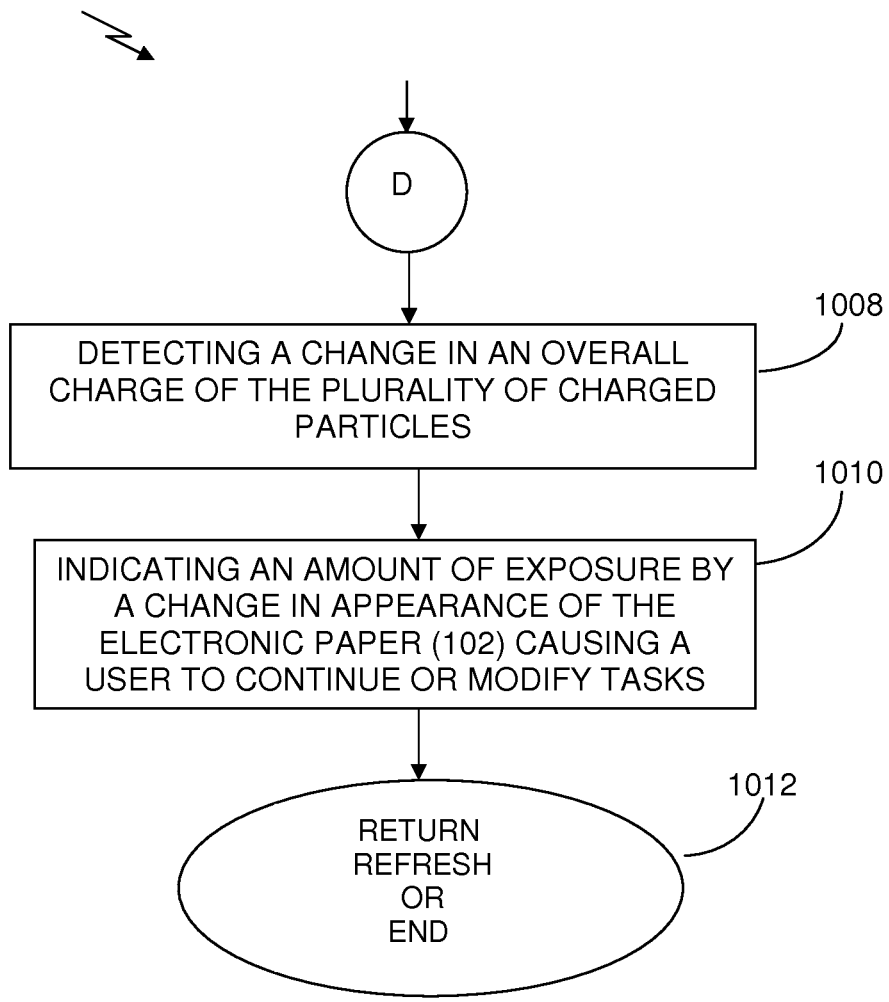
FIG. 10B illustrates a continuation of method 1000.

Referring to FIG. 10A and FIG. 10B, in accordance with the third exemplary embodiment, the operations of the method 1000 continue from FIG. 10A, at the operation 1004 to FIG. 10B, at operation 1008, as indicated by the continuation symbol "D" circled at the left side of FIG. 10A representing the continuation of the operations at symbol "D" circled at the top of FIG. 10B.

Referring to FIG. 1, FIG. 2, FIG. 3, and FIG. 10B, at an operation "detecting a change in an overall charge of the plurality of charged particles" 1008 (hereafter "the operation 1008"), and when the electrophoretic display 302 used as a dosimeter, is either irradiated by and/or exposed to either high energy radiation and/or one or more types of bio-chemical agents, the electrophoretic display 302 operates to either (in the case of high energy ionizing radiation) (1) read and/or detect the high energy radiation, by the electronic paper 102, either in an interacting operation, of the high energy radiation with the plurality of positively charged black particles and the plurality of negatively charged white particles, or (2) interact with the surroundings of the plurality of positively charged black particles and/or (3) interact with the surroundings of the plurality of negatively charged white particle(s).

The electrophoretic display 302 further operates to indicate, by the electronic paper 102 a change in the appearance and/or color of the electronic paper 102, based on changing, within the micro-container, the location and the charge of one or more of the positively charged black particle from the plurality of positively charged black particles to one or more of the negatively charged black particle and changing, within the micro-container, the location and the charge of one or more of the negatively charged white particle from the plurality of negatively charged white particles resulting from the particle changing operation, wherein appearance, color, and/or location of particles correlates with overall high energy radiation dosage and sensitivity to the high energy radiation by the electronic paper, where the change in appearance/color/location of particles can be visible to a human eye, thereby providing instantaneously in real time an indication, to an agent/operator, where the agent/operator is either a human and/or a non-human agent/operator, of an amount of exposure to the high energy radiation.

Further, according to the third exemplary embodiment, the overall charge of the plurality of charged particles, in the electrophoretic dosimeter apparatus, is changed by either modifying a zeta potential and/or changing surface reactions. The zeta potential is a universal description of the charge state of the whole solution, including solvent molecules and charge particles. Sensing could be done by changing the "charge" of the solvent molecules or the charged particles. A change in zeta potential describes both effects. The surface reaction is limited to the charge state of the particles.

During the above interacting operations, either a recoil electron and/or a hole can be generated from interactions by the high energy radiation with one or more of the positively charged black particle(s) from the plurality of positively charged black particles (such as the black micro particles 204) and one or more of the negatively charged white particle(s) from the plurality of negatively charged white particles (such as the white micro particles 208).

According to the third exemplary embodiment, at an operation "indicating an amount of exposure by a change in appearance of the electronic paper (102) causing a user to continue or modify tasks" 1010 (hereafter "the operation 1010"), the change in the appearance of the electrophoretic display, when noticed by the user/agent and/or operator, or detected by an automated reading and/or detecting apparatus causes the user/agent/operator to either continue or modify tasks in order to manually and/or automatically maintain a habitable environment, where the habitable environment can comprise a safe environment on Earth, in the Atmosphere or in space or underground, and in, or under the surface of water for humans to be able to continue life functions and/or where human life functions are not irreversibly damaged or affected by exposure to high energy radiation levels and/or chemical, biological and/or radiological events and/or agents. Also, the habitable environment can be an environment, such as that mentioned above where instruments and machines can survive and operate effectively notwithstanding the effects of high energy radiation and/or chemical, biological and/or radiological events and/or agents.

Referring to FIG. 10A and FIG. 10B, at an operation "return, refresh or end" 1012 (hereafter "the operation 1012"), the operations of the method 1000 can be either executed manually or automatically (automatically, when flexible electronics including one or more computer processors, computer memories and program code are implemented into the dosimeter) for either returning to any of the above operations and/or sub operations of the method 1000 and iteratively performing any one or more of the operations and/or sub operations and/or refreshing the electronic paper 102, until the operations of the method 1000 are completed, resulting in indicating an amount of exposure to the high energy ionizing radiation and/or bio-chemical agents.

Or, at the operation 1004, (referring to FIG. 10A and FIG. 10C), when there are no significant and/or detectable levels of high energy radiation in proximity to the dosimeter implemented in the electrophoretic display 302, then, the operations of the method 1000 continue at an operation of "exposing the electronic paper (102) to bio-chemical agents" 1006 (hereafter "the operation 1006"), where, when there are no significant levels of bio-chemical agents in proximity to the electrophoretic display 302, the operations of the method 1000 continue to the start operation, i.e., the operation 1002 for continued processing of the method 1000.

Figure 10C:
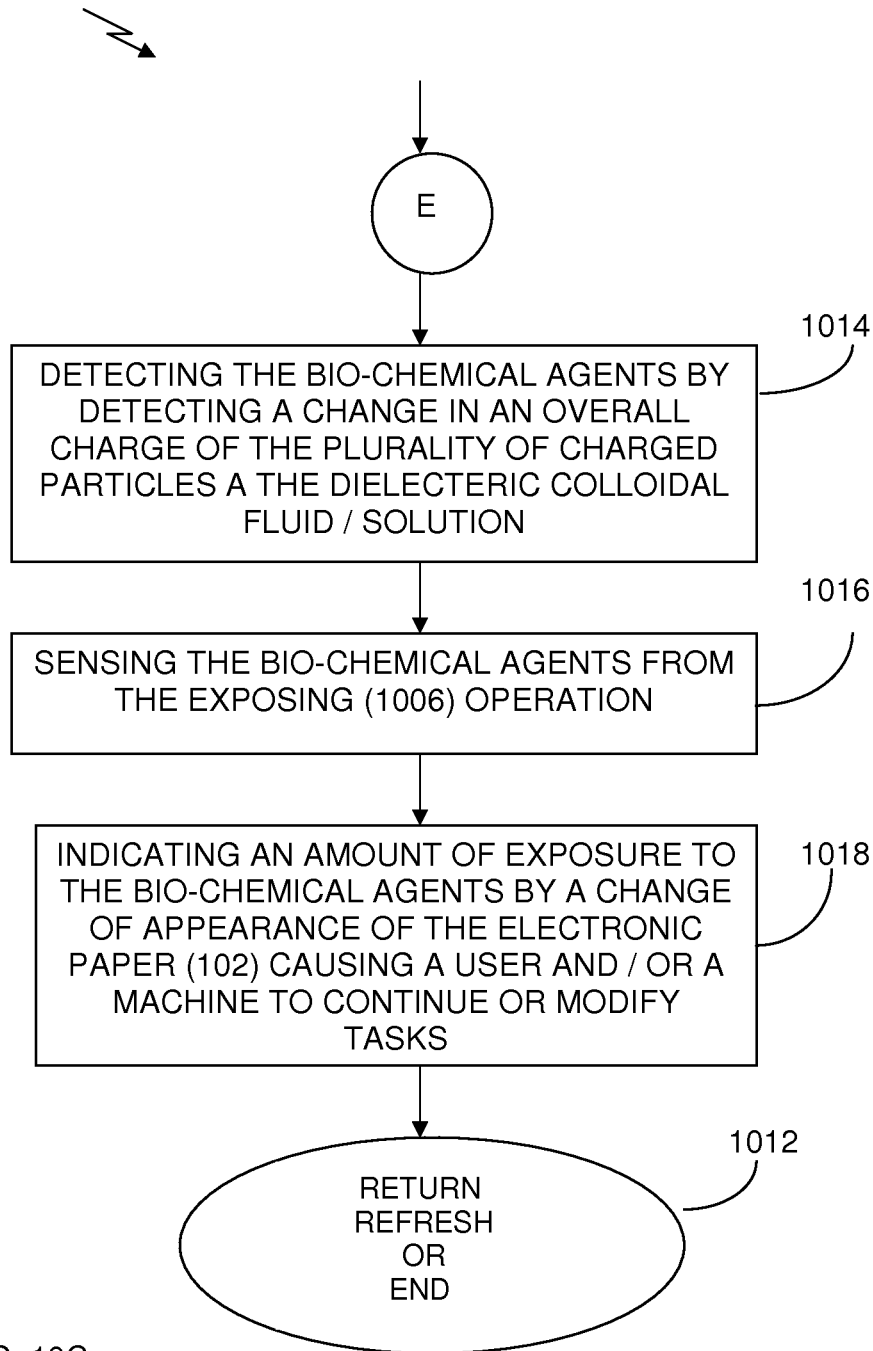
FIG. 10C illustrates of method 1000.

Or, at the operation 1004, (referring to FIG. 10A and FIG. 10C), the operation 1006 continues by detecting the exposure of the bio-chemical agents, as illustrated in FIG. 10C. Therefore, referring to FIG. 10A and FIG. 10C, in accordance with the third exemplary embodiment, the operations of the method 1000 continue from FIG. 10A, at the operation 1006 to FIG. 10C, at operation 1014, as indicated by the continuation symbol "E" circled at the right side of FIG. 10A representing the continuation of the operations of the method 1000 at symbol "E" circled at the top of FIG. 10C.

Referring to FIG. 1, FIG. 2, FIG. 3, and FIG. 10C, at an operation of "detecting the bio-chemical agents by detecting a change in an overall charge of the plurality of charged particles in a dielectric colloidal fluid/solution" 1014 (hereafter "the operation 1014"), the electronic paper 102 reads and/or detects exposure to the bio-chemical agents, by either interacting with the plurality of positively charged particles (such as the black micro particles 204), and generating either a recoil electron or a hole from one or more of the plurality of charged particles (such as the black micro particles 204).

Again referring to FIG. 1, FIG. 2, FIG. 3, and FIG. 10C, at a "sensing the bio-chemical agents from the exposing (1006)" operation 1016 (hereafter "the operation 1016"), the electronic paper 102 senses an amount of the exposure of the bio-chemical agents to the electronic paper 102, by either changing a location or changing a charge of one or more of the plurality of charged particles (such as the black micro particles 204) residing in the electrophoretic display 302.

According to the third exemplary embodiment, referring again to FIG. 1, FIG. 2, FIG. 3, and FIG. 10C, at an operation "indicating an amount of exposure to the bio-chemical agents by a change of appearance of the electronic paper (102) causing a user and/or a machine to continue or modify tasks" 1018 (hereafter "the operation 1018"), the electronic paper 102 acts as a combined sensor and display, (that is, the electronic paper 102 implemented in the electrophoretic display 302 combines two functions: (1) the sensing function and (2) the displaying function are combined into one material element (that one material element being the electronic paper 102), by changing the appearance of the electronic paper 102, and the detection of the change in appearance by a user or a robotic machine, causes the user and/or the machine to continue or modify tasks.

Referring to FIG. 10A and FIG. 10C, at an operation "return, refresh or end" 1012 (hereafter "the operation 1012"), the operations of the method 1000 can be either executed manually or automatically (automatically, when flexible electronics including one or more computer processors, computer memories and program code are implemented into the dosimeter) for either returning to any of the above operations and/or sub operations of the method 1000 and iteratively performing any one or more of the operations and/or sub operations and/or refreshing the electronic paper 102, until the operations of the method 1000 are completed, resulting in indicating an amount of exposure to bio-chemical agents and/or to the high energy ionizing radiation.

In addition, optionally, levels of high energy radiation and levels of bio-chemical agents can be exposed to and detected by the electrophoretic display 302 simultaneously.

Furthermore, according to the third exemplary embodiment, residing in the plurality of transparent micro-containers and/or in the transparent semipermeable membrane microsphere enclosures are a plurality of positively charged functionalized black particles (such as the black micro particles 204) and/or a plurality of negatively charged white particles (such as the white particles 208), in the dielectric colloidal fluid/solution.

According to the third exemplary embodiment, referring to FIG. 1 and FIG. 3, the electrophoretic display 302 further includes the electronic paper 102, having either a calibrated color guide and/or a calibrated gray-scale next to the electronic paper 102.

Furthermore, according to the third exemplary embodiment, the electrophoretic display 302 further includes a low voltage source, Further, according to the third exemplary embodiment, the electronic paper of the electrophoretic display 302 is refreshed by applying a voltage to zero-out the electrophoretic display 302 enabling the electrophoretic display 302 to be used repeatedly to provide instantaneous indications of the amount of exposure to the high energy radiation, wherein the electrophoretic display 302 is an ultra-low power display using power only when particles are moved within the microcontainer.

The electrophoretic display 302 is light weight, and can be either attached to the agent/operator or integrated into clothing or worn on clothing used by the agent/operator.

Optionally, in the case of the exposure to bio-chemicals, the electrophoretic display detects the exposure of the plurality of bio-chemical agents by either absorbing the plurality of bio-chemical agents, in an absorbing operation, and/or by absorbing the plurality of positively charged functionalized black carbon particles in the dielectric fluid in a two electron reaction of the plurality of positively charged functionalized black carbon particles, caused by exposing the electronic paper 102 to the plurality of bio-chemical agents in the exposing operation.

Further, the electrophoretic display can sense bio-chemical agents by generating, in a two electron reaction of the plurality of positively charged functionalized black carbon particles, caused by exposing the electronic paper to the plurality of bio-chemical agents in the exposing operation, either a change, in a particle changing operation, of a location and/or of a charge of one or more of the plurality of positively charged functionalized black carbon particles, by the two electron reaction in the dielectric fluid.

The electrophoretic display further operates to indicate, by the electronic paper, a change in the appearance/color of the electronic paper, based on changing, within the plurality of transparent semipermeable membrane micro-sphere enclosures, the location and the charge of one or more of the plurality of positively charged functionalized black carbon particles, where the appearance/color/location of the plurality of positively charged functionalized black carbon particles correlates with overall high bio-chemical agents dosage and sensitivity to the plurality of bio-chemical agents by the electronic paper, where the change in appearance/color/location of the plurality of positively charged functionalized black carbon particles can be visible to a human eye, thereby providing instantaneously in real time an indication of CBR exposure to an agent and/or operator of an amount of exposure to the plurality of bio-chemical agents.

The electrophoretic display is an ultra-low power display using power only when particles are moved within the microcontainer.

Because the electrophoretic display is ultra-light weight, it can be either easily attached to the agent/operator and/or easily integrated into clothing and worn on clothing used by the agent/operator. The agent and/or operator can be either a human and/or a non-human, such as an automated and/or robotic agent or operator.

According the third exemplary embodiment, the electrophoretic dosimeter further comprises flexible electronics integrated into the electrophoretic dosimeter apparatus.

According to the third exemplary embodiment, the electrophoretic dosimeter further comprising a plurality of microcontainers having at lest one wall (such as capsule wall 206) made of a semipermable membrane.

Thus, the breadth and scope of the present exemplary embodiments should not be limited by any of the above described preferred exemplary embodiments, but should be defined only in accordance with the following claims and their equivalents. All references cited herein, including issued U.S. patents, or any other references, are each entirely incorporated by reference herein, including all data, tables, figures, and text presented in the cited references. Also, it is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

What is claimed is:

1. A device comprising:
    a film laminated to a substrate, wherein the film comprises microcontainers containing:
        a liquid;
        particles comprising tungsten or CdTe; and
        carbon particles;
            wherein the tungsten or CdTe particles and the carbon particles are in a colloidal suspension in the liquid; and
    a voltage source coupled to the film capable of applying an electric field across the film; and a color scale indicating color changes in the film corresponding to one or more levels of exposure to gamma rays.

2. The device of claim 1, wherein the particles comprising tungsten.

3. The device of claim 1, wherein the particles comprising CdTe.

4. A method comprising:
providing a device comprising:
a film laminated to a substrate, wherein the film comprises microcontainers containing:
  a liquid;
  particles comprising tungsten or CdTe; and
  carbon particles;
    wherein the tungsten or CdTe particles and the carbon particles are in a colloidal suspension in the liquid;
a voltage source coupled to the film capable of applying an electric field across the film; and
a color scale indicating color changes in the film corresponding to one or more levels of exposure to gamma rays in an environment suspected of containing gamma rays; and
comparing the color scale to the film to determine the level of exposure to the film of gamma rays.

5. The method of claim 4, wherein a charge couple device imager is used to measure the color of the film.

6. The method of claim 4, further comprising:
activating the voltage source to restore the film to its original color.

\* \* \* \* \*